(12) United States Patent
Mizusawa

(10) Patent No.: US 9,893,870 B2
(45) Date of Patent: Feb. 13, 2018

(54) COMMUNICATION CONTROL DEVICE TO CONTROL AUTOMATIC REPEAT REQUEST PROCESSES

(71) Applicant: SONY CORPORATION, Tokyo (JP)

(72) Inventor: Nishiki Mizusawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 136 days.

(21) Appl. No.: 14/762,894

(22) PCT Filed: Nov. 27, 2013

(86) PCT No.: PCT/JP2013/081941
§ 371 (c)(1),
(2) Date: Jul. 23, 2015

(87) PCT Pub. No.: WO2014/122839
PCT Pub. Date: Aug. 14, 2014

(65) Prior Publication Data
US 2015/0358143 A1    Dec. 10, 2015

(30) Foreign Application Priority Data

Feb. 6, 2013   (JP) .................................. 2013-021324

(51) Int. Cl.
*H04J 3/00* (2006.01)
*H04L 5/14* (2006.01)
(Continued)

(52) U.S. Cl.
CPC .............. *H04L 5/14* (2013.01); *H04L 1/1822* (2013.01); *H04L 1/1854* (2013.01);
(Continued)

(58) Field of Classification Search
CPC ....... H04L 5/14; H04L 5/1469; H04L 5/0007; H04L 1/1822; H04L 1/1861;
(Continued)

(56) References Cited

U.S. PATENT DOCUMENTS

| 2011/0211503 A1* | 9/2011 | Che ...................... H04L 5/0005 370/280 |
| 2012/0120854 A1* | 5/2012 | Zhang .................. H04B 7/2656 370/280 |

(Continued)

FOREIGN PATENT DOCUMENTS

| EP | 2654235 A1 | 10/2013 |
| WO | 2012/134107 A2 | 10/2012 |

(Continued)

OTHER PUBLICATIONS

Extended Search Report of EP Application No. 13874265.5-1851, dated Sep. 23, 2016, pp. 11.

(Continued)

*Primary Examiner* — Clemence Han
(74) *Attorney, Agent, or Firm* — Chip Law Group

(57) ABSTRACT

Provided is a communication control device configured to control radio communication in accordance with a time division duplex (TDD) method, the communication control device including: a setting unit configured to set a link direction configuration indicating a link direction of each subframe, with respect to each frame including a plurality of subframes; and a control unit configured to control processes of automatic repeat request with respect to a terminal device that performs radio communication. The control unit controls the processes to make a number of the processes equal to or smaller than a maximum number according to setting of the link direction configuration.

18 Claims, 28 Drawing Sheets

(51) Int. Cl.
*H04W 72/02* (2009.01)
*H04L 5/00* (2006.01)
*H04L 1/18* (2006.01)
*H04W 72/04* (2009.01)

(52) U.S. Cl.
CPC .......... *H04L 1/1861* (2013.01); *H04L 5/0007* (2013.01); *H04L 5/1469* (2013.01); *H04W 72/02* (2013.01); *H04W 72/048* (2013.01); *H04W 72/0446* (2013.01)

(58) Field of Classification Search
CPC .. H04L 1/1854; H04W 72/048; H04W 72/02; H04W 72/0446
See application file for complete search history.

(56) References Cited

U.S. PATENT DOCUMENTS

| | | | |
|---|---|---|---|
| 2012/0320806 A1* | 12/2012 | Ji | H04B 7/2656 370/280 |
| 2013/0194980 A1* | 8/2013 | Yin | H04L 1/1854 370/280 |
| 2013/0223298 A1 | 8/2013 | Ahn et al. | |
| 2013/0272169 A1* | 10/2013 | Wang | H04W 72/0446 370/280 |
| 2013/0301490 A1* | 11/2013 | He | H04W 76/048 370/280 |
| 2014/0112217 A1 | 4/2014 | Ahn et al. | |
| 2014/0122957 A1 | 5/2014 | Charbit et al. | |
| 2015/0063180 A1* | 3/2015 | Chen | H04L 1/1822 370/280 |

FOREIGN PATENT DOCUMENTS

| | | |
|---|---|---|
| WO | 2012/162877 A1 | 12/2012 |
| WO | 2013/002562 A2 | 1/2013 |
| WO | 2015/044513 A1 | 4/2015 |

OTHER PUBLICATIONS

"Signalling Mechanisms for TDD UL-DL Reconfiguration", R1-130321, 3GPP TSG RAN WG1 Meeting #72, St Julian's, Malta, Jan. 28-Feb. 1, 2013, 3 pages.

"On HARQ Timing Issues for TDD UL-DL Reconfiguration", R1-130310, 3GPP TSG-RAN WG1 #72, Malta, Jan. 18-Feb. 1, 2013, 5 pages.

Office Action for JP Patent Application No. 2014-560645, dated Sep. 12, 2017, 3 pages of Office Action and 3 pages of English Translation.

* cited by examiner

FIG. 2

| | #0 | #1 | #2 | #3 | #4 | #5 | #6 | #7 | #8 | #9 |
|---|---|---|---|---|---|---|---|---|---|---|
| Configuration 0 | D | S | U | U | U | D | S | U | U | U |
| Configuration 1 | D | S | U | U | D | D | S | U | U | D |
| Configuration 2 | D | S | U | D | D | D | S | U | D | D |
| Configuration 3 | D | S | U | U | U | D | D | D | D | D |
| Configuration 4 | D | S | U | U | D | D | D | D | D | D |
| Configuration 5 | D | S | U | D | D | D | D | D | D | D |
| Configuration 6 | D | S | U | U | U | D | S | U | U | D |

FIG. 4

| UL-DL CONFIGURATION | SUBFRAME n | | | | | | | | | |
|---|---|---|---|---|---|---|---|---|---|---|
| | 0 | 1 | 2 | 3 | 4 | 5 | 6 | 7 | 8 | 9 |
| 0 | - | - | 6 | - | 4 | - | - | 6 | - | 4 |
| 1 | - | - | 7, 6 | 4 | - | - | - | 7, 6 | 4 | - |
| 2 | - | - | 8, 7, 4, 6 | - | - | - | - | 8, 7, 4, 6 | - | - |
| 3 | - | - | 7, 6, 11 | 6, 5 | 5, 4 | - | - | - | - | - |
| 4 | - | - | 12, 8, 7, 11 | 6, 5, 4, 7 | - | - | - | - | - | - |
| 5 | - | - | 13, 12, 9, 8, 7, 5, 4, 11, 6 | - | - | - | - | - | - | - |
| 6 | - | - | 7 | 7 | 5 | - | - | 7 | 7 | - |

FIG. 5

| TDD UL/DL CONFIGURATION | SUBFRAME INDEX n | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

FIG. 6

| TDD UL/DL CONFIGURATION | MAXIMUM NUMBER OF HARQ PROCESSES |
|---|---|
| 0 | 4 |
| 1 | 7 |
| 2 | 10 |
| 3 | 9 |
| 4 | 12 |
| 5 | 15 |
| 6 | 6 |

FIG. 7

| TDD UL/DL CONFIGURATION | NUMBER OF HARQ PROCESSES FOR NORMAL HARQ OPERATION | NUMBER OF HARQ PROCESSES FOR SUBFRAME BUNDLING OPERATION |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

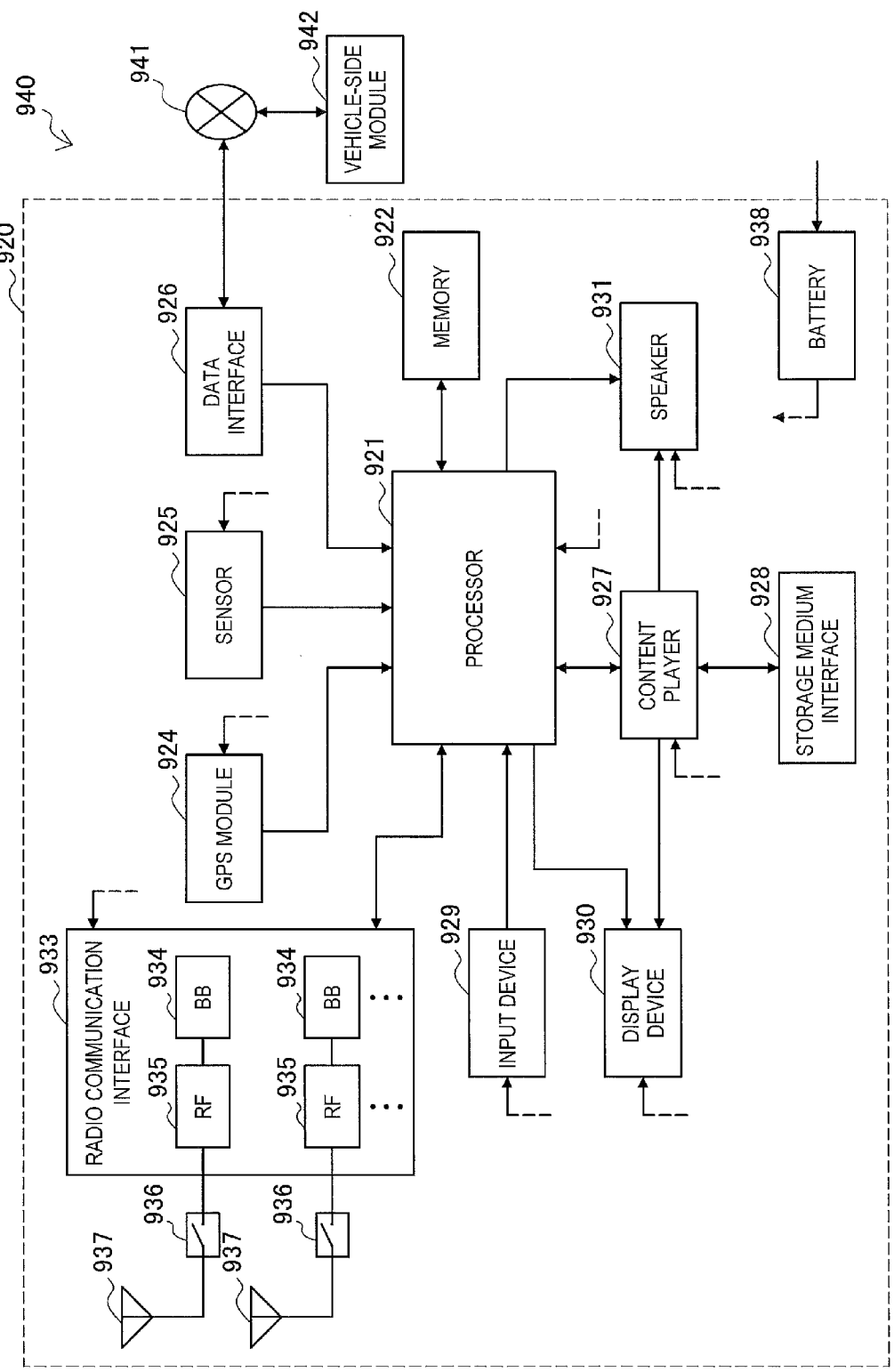

COMMUNICATION CONTROL DEVICE TO CONTROL AUTOMATIC REPEAT REQUEST PROCESSES

TECHNICAL FIELD

The present disclosure relates to a communication control device, a communication control method, and a terminal device.

BACKGROUND ART

LTE (Long Term Evolution), which is standardized by the third generation partnership project (3GPPP), may be employed in each of frequency division duplex (FDD) and time division duplex (TDD). Because of easiness in frequency configuration and changeability of proportions of radio resources for uplink and downlink, it is envisaged that TDD is employed in many systems in future for the effective utilization of frequency.

In TDD, a link direction (for example, downlink, and uplink) is set for each subframe. More specifically, a plurality of TDD configurations (or a plurality of uplink and downlink configurations) each indicating the link direction of each subframe are prepared in advance, and one of the TDD configurations is used. For example, a communication business operator selects one TDD configuration from among seven TDD configurations defined in the LTE technology standard, and sets it in a fixed manner. Further, 3GPP is studying a method which dynamically sets an optimal TDD configuration in response to traffic in a cell, aiming at improving throughput of the entire network in future. Various technologies related to dynamic setting of TDD configuration have been proposed.

For example, Patent Literature 1 discloses a technology which adjusts timing of acknowledgement and negative acknowledgement (ACK and NACK) for a hybrid automatic repeat request (HARQ), when dynamically setting a TDD configuration.

CITATION LIST

Non-Patent Literature

Non-Patent Literature 1: Alcatel-Lucent Shanghai Bell, Alcatel-Lucent, Discussion on HARQ and UL-grant timing with dynamic TDD UL-DL configuration, 3GPP TSG RAN WG1 Meeting #68bis, R1-121260, 26-30 Mar. 2012

SUMMARY OF INVENTION

Technical Problem

However, even if the technology of above Non-Patent Literature 1 is used, a utilization loss of radio resources can occur due to the maximum number of the HARQ processes. Specifically, a first maximum number of HARQ set with respect to a first TDD configuration which has been set already can be larger than a second maximum number of HARQ set with respect to a second TDD configuration which is set newly, in some cases. In such cases, a part of the existing HARQ processes can be deleted immediately after setting the second TDD configuration. Thus, an ACK or a NACK may not be transmitted after setting the second TDD configuration for the deleted HARQ processes, and therefore for example data may not be transmitted for the deleted HARQ processes immediately before setting the second TDD configuration. That is, there is a subframe for which a terminal device does not transmit or receive data immediately before setting the second TDD configuration. As a result, it is concerned that utilization loss of radio resources occurs when a new TDD configuration is set.

Thus, it is desirable to provide a scheme that more effectively utilizes radio resources when the TDD configuration is set dynamically.

Solution to Problem

According to the present disclosure, there is provided a communication control device configured to control radio communication in accordance with a time division duplex (TDD) method, the communication control device including: a setting unit configured to set a link direction configuration indicating a link direction of each subframe, with respect to each frame including a plurality of subframes; and a control unit configured to control processes of automatic repeat request with respect to a terminal device that performs radio communication. The control unit controls the processes to make a number of the processes equal to or smaller than a maximum number according to setting of the link direction configuration. When a second link direction configuration is set by the setting unit after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

According to the present disclosure, there is provided a communication control method in a communication control device that controls radio communication in accordance with a time division duplex (TDD) method, the communication control method including: setting a link direction configuration indicating a link direction of each subframe, with respect to each frame including a plurality of subframes; and controlling processes of automatic repeat request with respect to a terminal device that performs radio communication. The controlling of the processes includes controlling the processes in such a manner that a number of the processes is equal to or smaller than a maximum number according to setting of the link direction configuration. When a second link direction configuration is set after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

According to the present disclosure, there is provided a terminal device that performs radio communication in accordance with a time division duplex (TDD) method, the terminal device including: a communication control unit configured to control, when a link direction configuration indicating a link direction of each subframe is set with respect to each frame including a plurality of subframes, radio communication in accordance with the set link direction configuration. The communication control unit controls processes of automatic repeat request with respect to the terminal device. The communication control unit controls the processes in such a manner that a number of the processes is equal to or smaller than a maximum number according to setting of the link direction configuration. When a second link direction configuration is set after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

According to the present disclosure, there is provided a communication control device that controls radio communication in two or more frequency bands in accordance with a time division duplex (TDD) method, the communication control device including: a setting unit configured to set a link direction configuration indicating a link direction of each subframe, with respect to each frame including two or more subframes, for each frequency band. The setting unit sets the link direction configuration at a first time in one frequency band of the two or more frequency bands, and sets the link direction configuration at a second time that is different from the first time, in another frequency band of the two or more frequency bands.

Advantageous Effects of Invention

As described above, according to the present disclosure, the radio resources are utilized more effectively when the TDD configuration is set dynamically.

BRIEF DESCRIPTION OF DRAWINGS

FIG. 2 is an explanatory diagram for describing an example of TDD configurations defined in 3GPP.

FIG. 4 is an explanatory diagram for describing a relationship between a subframe in which downlink data is transmitted and received and a subframe in which an ACK or a NACK is transmitted and received in response to the downlink data.

FIG. 5 is an explanatory diagram for describing a relationship between a subframe in which uplink data is transmitted and received and a subframe in which an ACK or a NACK is transmitted and received in response to the uplink data.

FIG. 6 is an explanatory diagram for describing the maximum number of HARQ processes for downlink data.

FIG. 7 is an explanatory diagram for describing the maximum number of HARQ processes with respect to uplink data.

FIG. 29 is a block diagram illustrating an example of a schematic configuration of a car navigation device to which technology according to the present disclosure may be applied.

DESCRIPTION OF EMBODIMENTS

Figure 1:
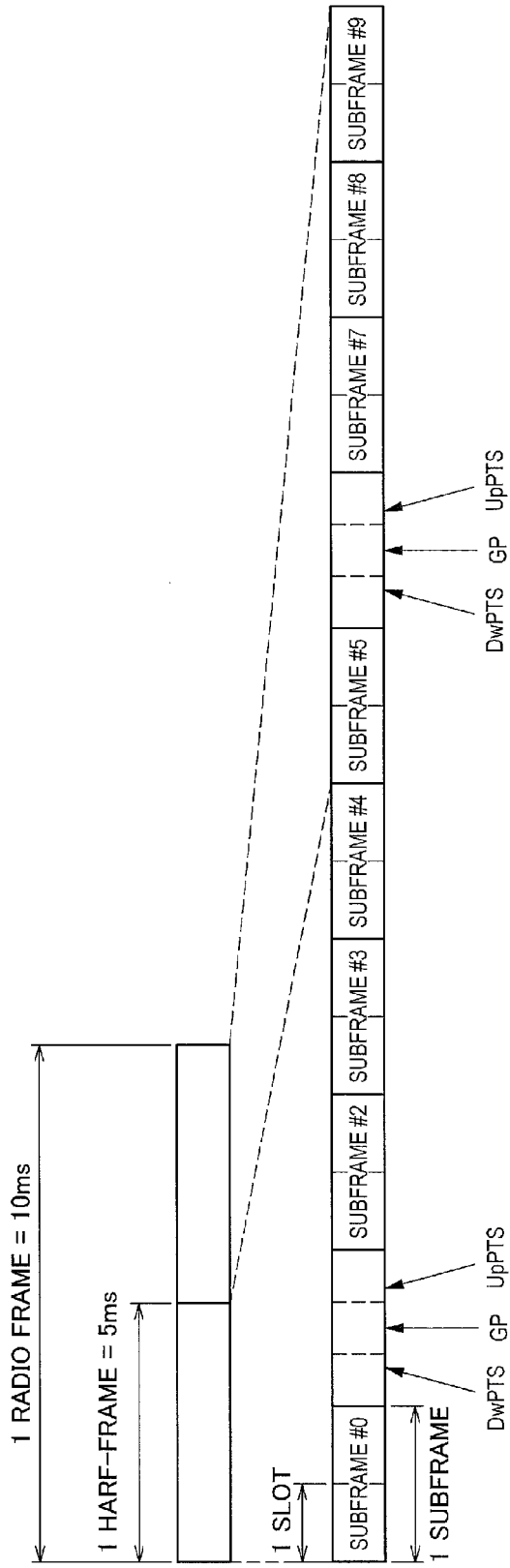
FIG. 1 is an explanatory diagram for describing an example of a frame format of TDD.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be made in the following order.
1. Introduction
   1.1. Technology of Radio Communication in 3GPP
   1.2. Technical Problem
2. Configuration of Communication System
3. First Embodiment
   3.1. Configuration of Base Station
   3.2. Configuration of Terminal Device
   3.3. Flow of Process
4. Second Embodiment
   4.1. Configuration of Base Station
   4.2. Flow of Process
5. Second Embodiment
   5.1. Configuration of Base Station
   5.2. Flow of Process
6. Application Example
   6.1. Application Example Relevant to Base Station
   6.2. Application Example Relevant to Terminal Device
7. Conclusion

1. INTRODUCTION

First, with reference to FIGS. 1 to 12, an underlying technology of radio communication in 3GPP and its technical problem will be described.
<1.1. Technology of Radio Communication in 3GPP>

With reference to FIGS. 1 to 10, an underlying technology of radio communication in 3GPP will be described.
(FDD and TDD)

LTE standardized by 3GPPP can be employed in each of FDD and TDD. Because of easiness in configuration of frequency and changeability of proportions of radio resources for uplink and downlink, it is envisaged that TDD is employed in many systems in future for the effective utilization of frequency.
(Frame Format of TDD)

With reference to FIG. 1, an example of a frame format of TDD will be described. FIG. 1 is an explanatory diagram for describing an example of the frame format of TDD. Referring to FIG. 1, one radio frame including ten subframes is used when TDD is employed. In the present specification, the radio frame is also simply referred to as "frame". Each of ten subframes included in a radio frame is one of downlink subframe, uplink subframe, and special subframe.

The frame format illustrated in FIG. 1 is a format for a base station. For example, the reception completion, at a terminal device, of a signal transmitted in a downlink subframe from the base station is later than timing of the downlink subframe of the above frame format, due to the propagation delay in a space and the processing delay in a terminal device. Also, conversely, the transmission, at a terminal device, of a signal which is received in an uplink subframe by the base station is sooner than timing of the uplink subframe of the above frame format. That is, the terminal device transmits a signal to the base station in advance.

Also, a special subframe includes a downlink pilot time slot (DwPTS) of downlink part, an uplink pilot time slot (UpPTS) of uplink part, and a guard period (GP). The DwPTS includes a PDCCH. Also, the UpPTS does not include data. Also, the GP is a time region which compensates for delay of reception in downlink and early transmission in uplink at a terminal device.
(TDD Configuration)

In the TDD, a link direction (for example, downlink or uplink) is set for each subframe. More specifically, a plurality of TDD configurations each indicating a link direction of each subframe are prepared in advance, and one of the TDD configurations is used. In the following, with reference to FIG. 2, a specific example of the TDD configurations will be described.

FIG. 2 is an explanatory diagram for describing an example of the TDD configurations defined in 3GPP. Referring to FIG. 2, seven configurations defined in the LTE technology standard (TS 36.211 Table 4.2-2) are illustrated. The link directions of subframes #0 and #5 are fixed to downlink, for the purpose of transmission of a synchronization signal by the base station. Also, the link direction of the subframe #2 is fixed to uplink. Hence, the subframe #1 is a special subframe in every configuration. The link directions of the subframes #3, #4, #7, #8, and #9 are either uplink or downlink. Also, the subframe #6 is either a special subframe or a downlink subframe.

For example, a communication business operator selects one TDD configuration from among the seven TDD configurations, and sets it in a fixed manner.
(Dynamic Setting of TDD Configuration)

Further, 3GPP is studying dynamic setting of an optimal TDD configuration in response to traffic in a cell (i.e., Dynamic TDD Reconfiguration), aiming at improving throughput of the entire network in future.

For example, a TDD configuration including more uplink subframes is selected, when the traffic increases in uplink. Also, for example, a TDD configuration including more downlink subframes is selected, when the downlink traffic increases.

Such traffic characteristics differ from cell to cell, and fluctuate over time. Hence, it is desirable that the TDD configuration be dynamically set at short time intervals for each cell.

Note that a terminal device may be notified of the TDD configuration used in a cell by means of system information that any terminal device can receive, or by means of signaling to an individual terminal device.
(HARQ Process)

In LTE, a retransmission protocol is prepared in two layers, an MAC layer and a RLC layer, for the purpose of retransmission of lost data and error containing data. As the retransmission protocol in the MAC layer, a hybrid automatic repeat request (HARQ) protocol is used.

In the HARQ protocol, a HARQ entity is present at each of the base station and the terminal devices. Then, each HARQ entity is configured by a plurality of HARQ processes which operate in parallel.

Upon receiving data for a certain HARQ process, a reception side tries decoding the data and transmits a confirmation reply (ACK/NACK) indicating whether or not the data has been correctly received, to a transmission side. When receiving an ACK to the above data for HARQ process, the transmission side transmits next data for the HARQ process. On the other hand, when receiving a NACK to the above data for the HARQ process, the transmission side retransmits the above data for the HARQ process.

It is desirable that a terminal device spend a shorter time after downlink data reception until ACK and NACK transmission. However, in order to shorten the time, the terminal device is to have high throughput. That is, there is trade-off between the above time and complexity of implementation in the terminal device. There is a trade-off relationship between delay and complexity of implementation in the terminal device.

HARQ Process in FDD

In FDD, the standard prescribes to use eight HARQ processes in each of downlink and uplink in consideration of the above trade-off relationship.

Specifically, an ACK or a NACK in response to downlink data is transmitted by a terminal device at a fourth subframe after the subframe in which downlink data is received. Also, the base station retransmits the above downlink data at a fourth subframe after the subframe in which the ACK or NACK is received, in response to reception of the ACK or NACK, or transmits next downlink data. As described above, in FDD, the round-trip time is eight subframes (8 ms) with respect to HARQ processes. Hence, eight HARQs are used to enable transmission and reception at all subframes. In the following, a specific example of transmission and reception of data using such HARQ processes will be described with reference to FIG. 3.

Figure 3:
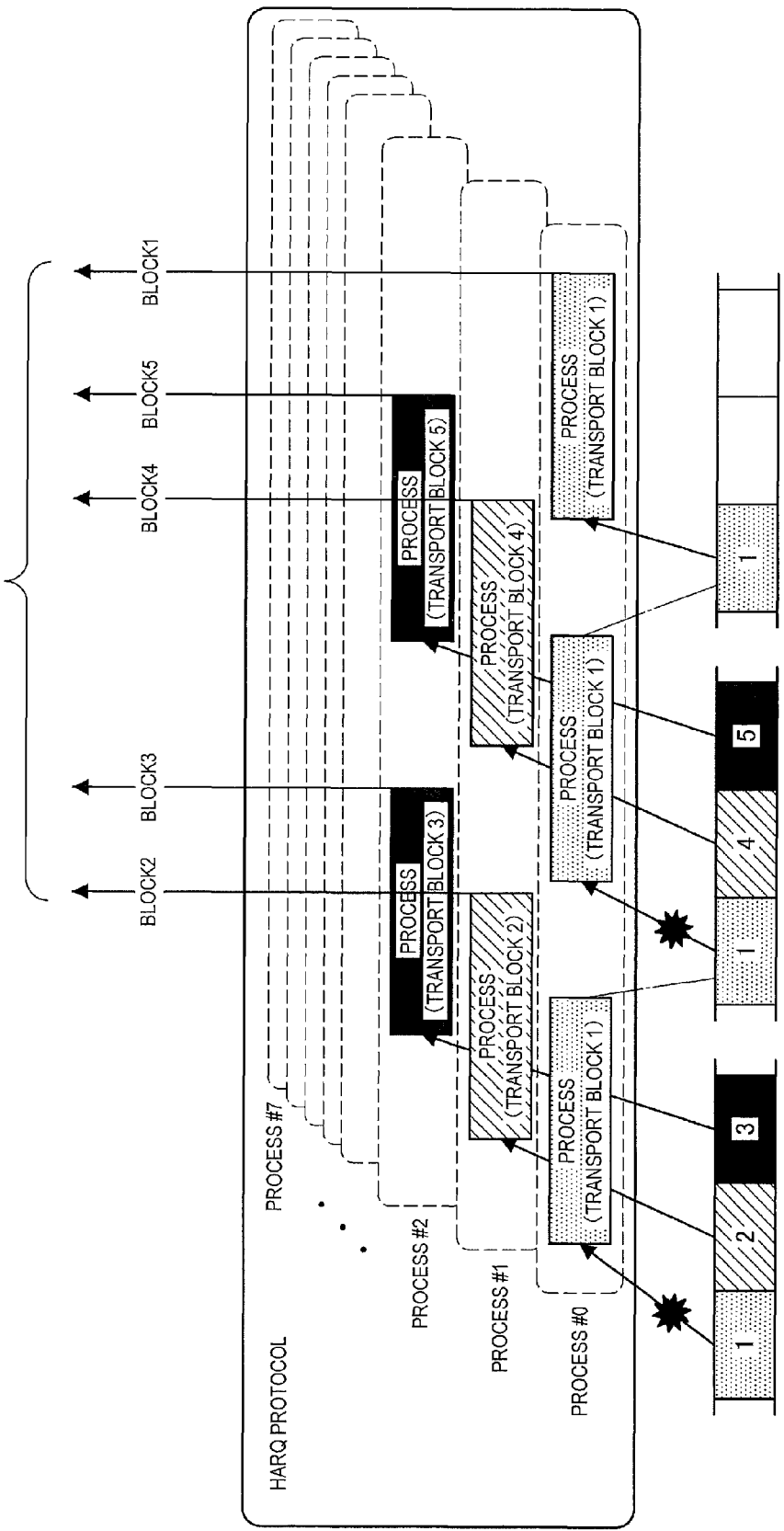
FIG. 3 is an explanatory diagram for describing an example of transmission and reception of data using HARQ processes.

FIG. 3 is an explanatory diagram for describing an example of transmission and reception of data using the HARQ process. Referring to FIG. 3, for example, eight HARQ processes #0 to #7 are illustrated. For example, in a certain radio frame, a transport block 1 is received at the process #0, and a transport block 2 is received at the process #2, and a transport block 3 is received at the process #3. Also, in another radio frame, a transport block 1 is received at the process #0, and a transport block 4 is received at the process #2, and a transport block 5 is received at the process #3.

As described above, high-speed data communication with few errors is achieved by allocating memory regions for HARQ processes in both of the base station and the terminal device and managing transmission and reception data, status, and the like.

HARQ Processes in TDD

On the other hand, in TDD, the fourth subframe after a downlink subframe is not necessarily an uplink subframe. Thus, the relationship between a subframe that transmits and receives data and a subframe that transmits and receives an ACK or a NACK in response to the data depends on the setting of the TDD configuration. Hence, in 3GPP, the relationship is prescribed for each TDD configuration. In the following, with reference to FIGS. 4 and 5, the above relationship will be described specifically.

FIG. 4 is an explanatory diagram for describing a relationship between a subframe in which downlink data is transmitted and received and a subframe in which an ACK or a NACK is transmitted and received in response to the downlink data. The relationship is defined in the LTE technology standard (TS36.213 Table 10.1.3.1-1). FIG. 4 indicates how many subframes precede each subframe in which an ACK or a NACK is transmitted and received, when downlink data corresponding to the ACK or NACK is transmitted and received, with respect to each TDD configuration. For example, when the TDD configuration #3 is set, a NACK or a NACK received by the base station in the subframe #2 is a NACK or a NACK in response to the downlink data transmitted by the base station in sixth, seventh, and eleventh previous subframes.

FIG. 5 is an explanatory diagram for describing a relationship between a subframe in which uplink data is transmitted and received and a subframe in which an ACK or a NACK is transmitted and received in response to the uplink data. The relationship is defined in the LTE technology standard (TS36.213 Table 9.1.2-1). FIG. 5 indicates how many subframes follow each subframe in which uplink data is transmitted and received, when an ACK or a NACK corresponding to the uplink data is transmitted, with respect to each TDD configuration. For example, when the TDD configuration #3 is set, a NACK or a NACK in response to the uplink data received by the base station in the subframe #2 is transmitted by the base station in a sixth subsequent subframe.

The round-trip time for each HARQ process varies depending on the TDD configuration, because of the operation timing described above. As a result, the number of HARQ processes also varies depending on the TDD configuration. Hence, 3GPP prescribes the number of HARQ processes depending on the TDD configuration. In the following, this point will be described specifically, with reference to FIGS. 6 and 7.

FIG. 6 is an explanatory diagram for describing the maximum number of HARQ processes for downlink data. The technology standard (TS 36.213) of 3GPP sets the maximum number of HARQ processes for downlink data, with respect to each TDD configuration, as illustrated in FIG. 6. When the maximum number of HARQ processes are used, downlink data is transmitted or received in each downlink subframe, without generating utilization loss of radio resources in any downlink subframe.

FIG. 7 is an explanatory diagram for describing the maximum number of HARQ processes with respect to uplink data. The technology standard (TS 36.213) of 3GPP sets the maximum number of HARQ processes with respect to uplink data, for each TDD configuration, as illustrated in FIG. 7. When the maximum number of HARQ processes are used, uplink data is transmitted or received in each uplink subframe, without generating utilization loss of radio resources in any uplink subframe.

(Timing of ACK and NACK when Setting New TDD Configuration)

As described above, dynamic setting of TDD configuration (i.e., Dynamic TDD Reconfiguration) can be used. In this case, it is possible that an ACK or a NACK in response to data received before changing the TDD configuration is unable to be transmitted at a time that is prescribed in the above technology standard, after changing the TDD configuration. In the following, a specific example of this point will be described with reference to FIGS. 8 and 9. This example is presented in the discussion of 3GPP (refer to Non-Patent Literature "Alcatel-Lucent Shanghai Bell, Alcatel-Lucent, Discussion on HARQ and UL-grant timing with dynamic TDD UL-DL configuration, 3GPP TSG RAN WG1 Meeting #68bis, R1-121260, 26-30 Mar. 2012").

Figure 8:
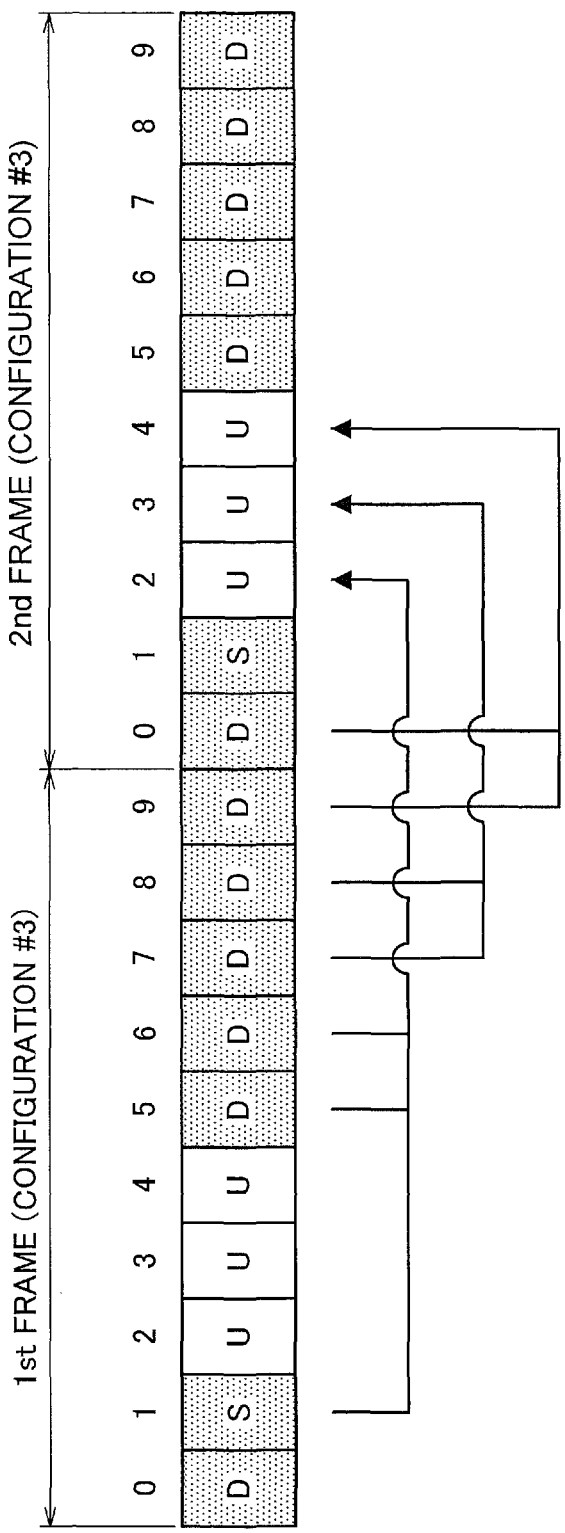
FIG. 8 is an explanatory diagram for describing an example of ACK and NACK transmission timing when a TDD configuration is not changed.

FIG. 8 is an explanatory diagram for describing an example of ACK and NACK transmission timing when the TDD configuration is not changed. Referring to FIG. 8, ACK and NACK transmission timing in response to downlink data received in a downlink subframe (or a special subframe) is illustrated. In this example, the TDD configuration #3 is set in both of two radio frames. For example, the downlink data is transmitted and received in a special subframe #1 and downlink subframes #5 and #6 in a first frame. Then, an ACK or a NACK is transmitted and received in response to the above downlink data in the uplink subframe #2 of a second frame. Also, downlink data is transmitted and received in the downlink subframes #7 and #8 in the first frame. Then, an ACK or a NACK is transmitted and received in response to the downlink data, in the uplink subframe #3 of the second frame. Also, downlink data is transmitted and received in the downlink subframe #9 in the first frame and the downlink subframe #0 in the second frame. Then, an ACK or a NACK is transmitted and received in response to the downlink data, in the uplink subframe #4 of the second frame.

Figure 9:
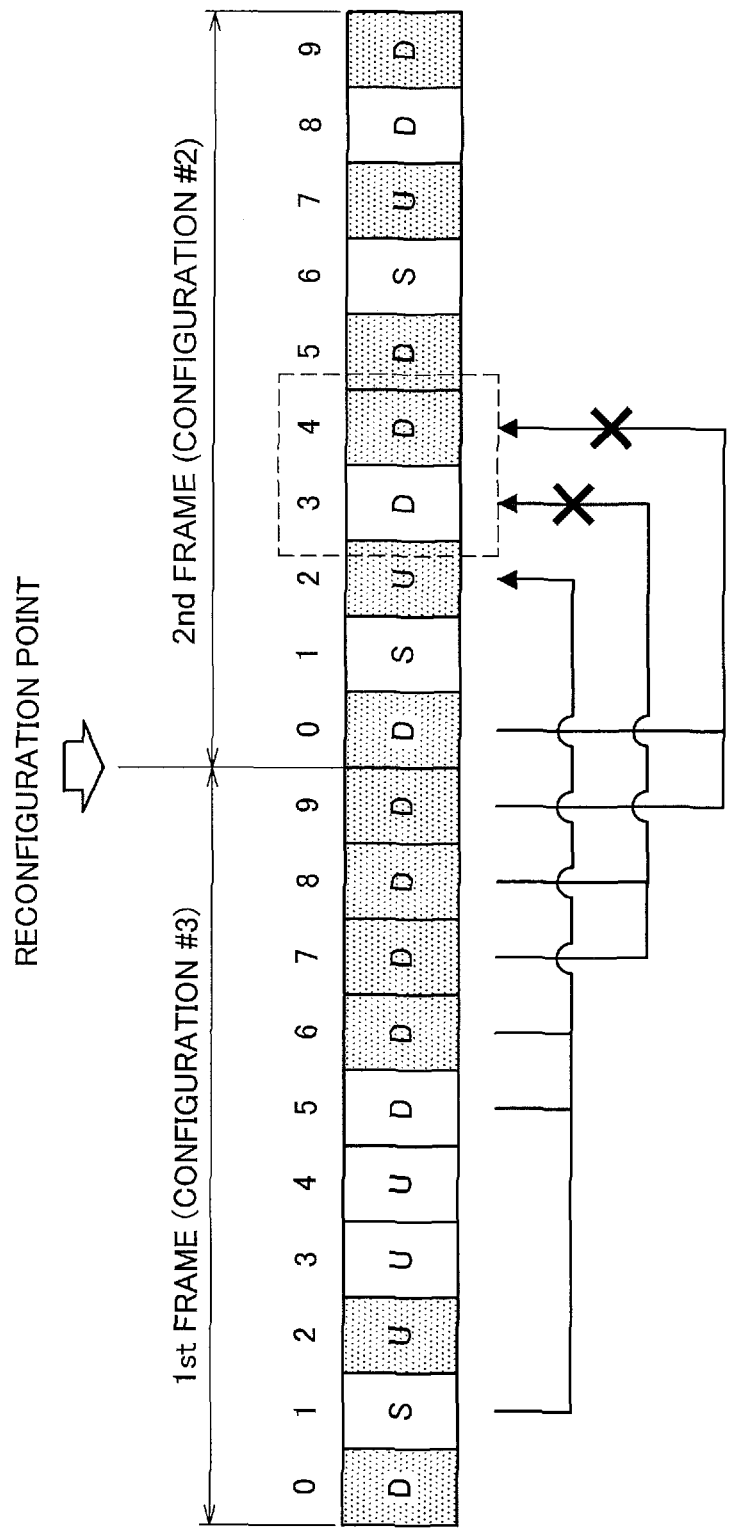
FIG. 9 is an explanatory diagram for describing an example of a failure relevant to ACK and NACK transmission when a TDD configuration is changed.

FIG. 9 is an explanatory diagram for describing an example of failure relevant to ACK and NACK transmission when the TDD configuration is changed. Referring to FIG. 9, ACK and NACK transmission timing in response to downlink data received in a downlink subframe (or a special subframe) is illustrated, in the same way as FIG. 8. Note that, in this example, the TDD configuration #3 is set in the first radio frame, and the TDD configuration #2 is set in the second radio frame. Hence, as opposed to the example of FIG. 8, the subframes #3 and #4 of the second radio frame are not uplink subframes, but downlink subframes. As a result, the terminal device does not transmit an ACK or a NACK in response to the downlink subframes #7 and #8 in the first frame, at the same time as the example of FIG. 8 (i.e., the subframe #3 of the second frame). Also, the terminal device does not transmit an ACK or a NACK in response to the downlink subframe #9 in the first frame and the downlink subframe #0 in the second frame, at the same time as the example of FIG. 8 (i.e., the subframe #4 of the second frame).

As above, when the TDD configuration is set dynamically, timing of transmission and reception of an ACK and a NACK which is set with respect to the TDD configuration before change is difficult to apply as it is. Hence, in the discussion of 3GPP, it is proposed to introduce new timing for transmission and reception of an ACK and a NACK when the TDD configuration is set dynamically (refer to the aforementioned literature of 3GPP (R1-121260)). In the following, a specific example of this proposal will be described with reference to FIG. 10.

Figure 10:
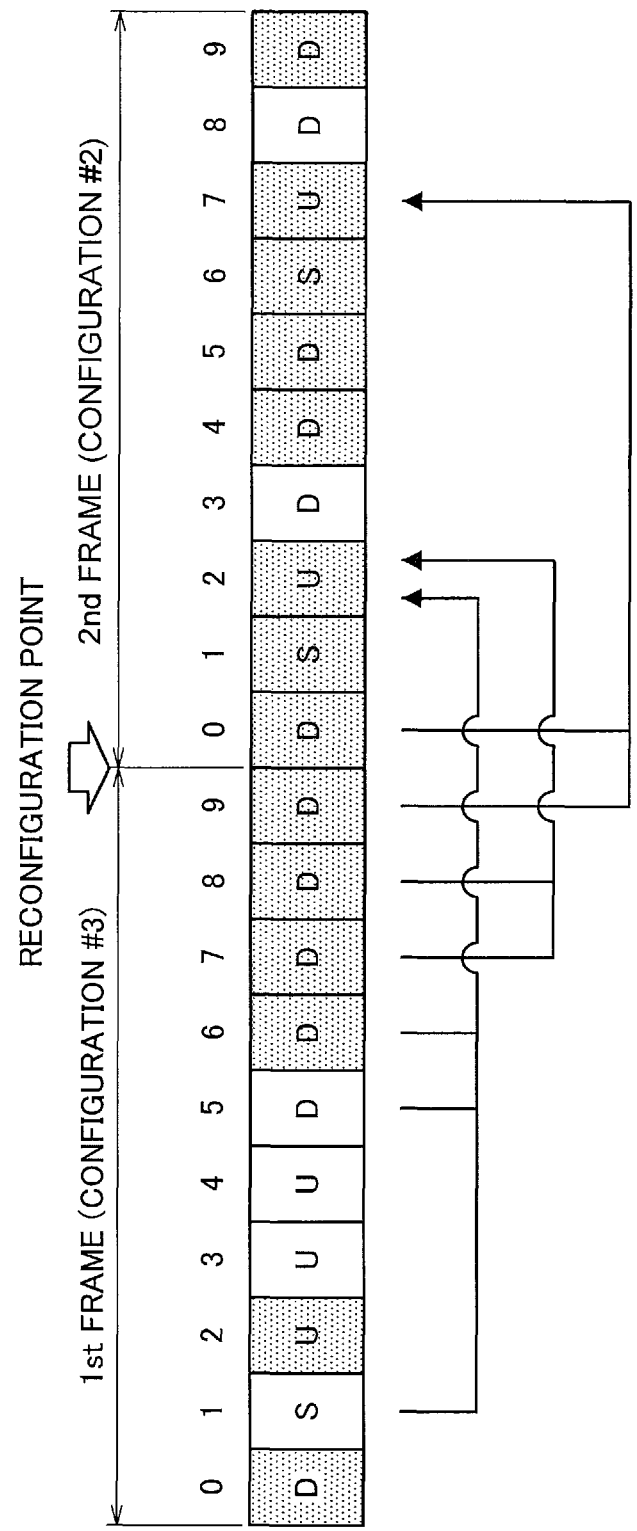
FIG. 10 is an explanatory diagram for describing an example of new timing of ACK and NACK transmission when a TDD configuration is changed.

FIG. 10 is an explanatory diagram for describing an example of new timing of ACK and NACK transmission when the TDD configuration is changed. Referring to FIG. 10, new timing of ACK and NACK transmission in response to the downlink data received in a downlink subframe (or a special subframe) is illustrated. In this example, in the same way as FIG. 9, the TDD configuration #3 is set in the first radio frame, and the TDD configuration #2 is set in the second radio frame. For example, in the same way as an example illustrated in FIGS. 8 and 9, downlink data is transmitted and received in the downlink subframes #7 and #8 in the first frame. However, as opposed to the example illustrated in FIGS. 8 and 9, an ACK or a NACK is transmitted and received in response to the downlink data, in the uplink subframe #2 of the second frame. Also, in the same way as an example illustrated in FIGS. 8 and 9, the downlink data is transmitted and received in the downlink subframe #9 in the first frame and the downlink subframe #0 in the second frame. However, as opposed to the example illustrated in FIGS. 8 and 9, an ACK or a NACK is transmitted and received in response to the downlink data, in the uplink subframe #7 of the second frame.

With introduction of the above new timing, an ACK or a NACK set with respect to the TDD configuration before change is appropriately transmitted and received, even when the TDD configuration is dynamically set.

<1.2. Technical Problem>

As described above, even when the TDD configuration is dynamically set, an ACK or a NACK is appropriately transmitted and received. However, even if such a method is used, utilization loss of the radio resources can occur due to the maximum number of HARQ processes.

Specifically, the first maximum number of HARQ set with respect to the first TDD configuration which has been set already is larger than the second maximum number of HARQ set with respect to the second TDD configuration that is newly set, in some cases. In such cases, a part of the existing HARQ processes can be deleted immediately after setting the second TDD configuration. Hence, an ACK or a NACK is not transmitted after setting the second TDD configuration in the deleted HARQ processes, and therefore, for example, data is not transmitted in the deleted HARQ processes, immediately before setting the second TDD configuration. That is, there is a subframe for which the terminal device does not transmit or receive data immediately before setting the second TDD configuration. As a result, it is concerned that utilization loss of radio resources occurs, when a new TDD configuration is set. In the following, a specific example of this point will be described with reference to FIGS. 11 and 12.

Example of Transmission and Reception of Downlink Data

Figure 11:
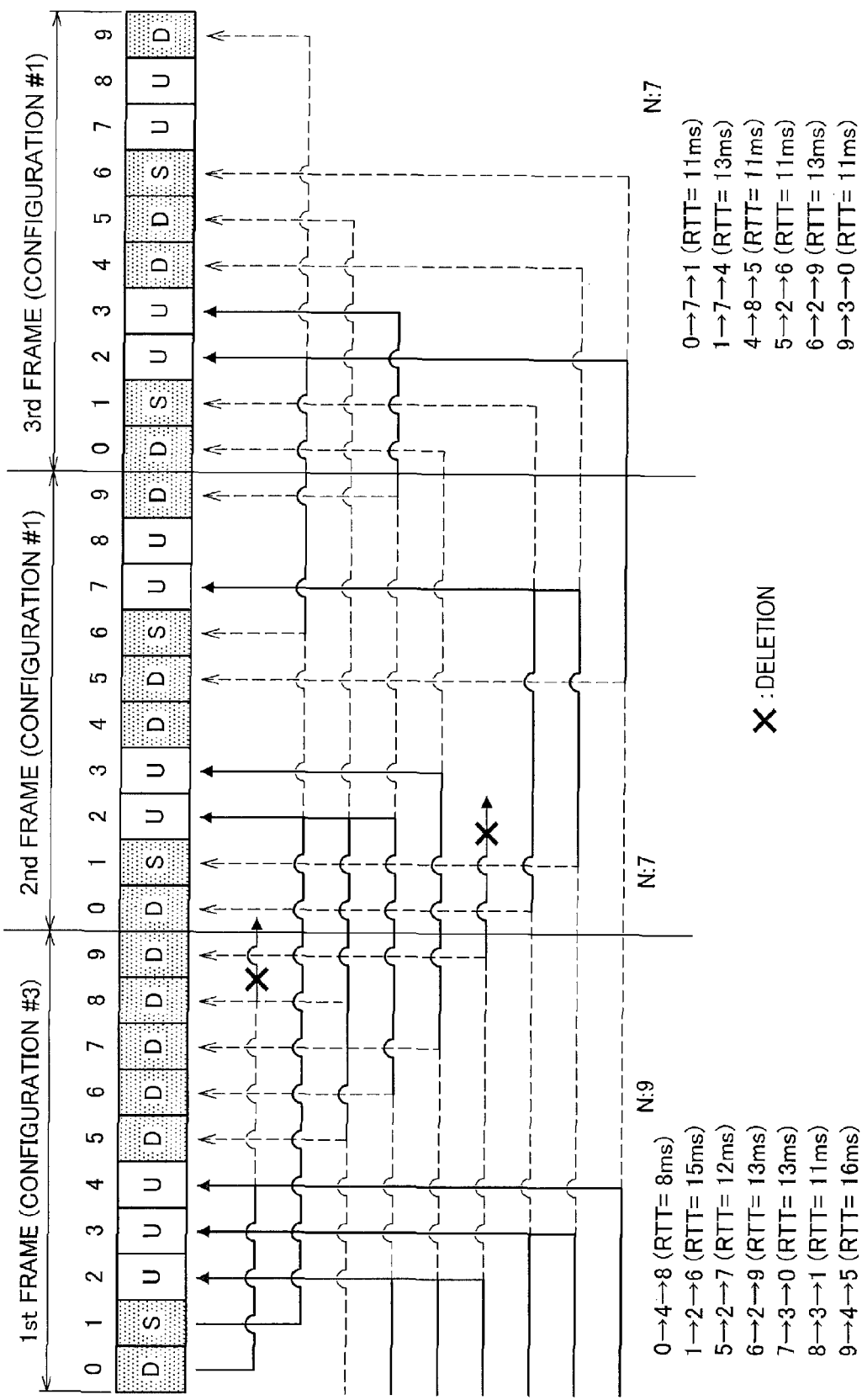
FIG. 11 is an explanatory diagram for describing an example of transmission and reception of downlink data in HARQ processes when a TDD configuration is set dynamically.

FIG. 11 is an explanatory diagram for describing an example of transmission and reception of downlink data in HARQ processes when the TDD configuration is set dynamically. Referring to FIG. 11, three radio frames and subframes included in the three radio frames are illustrated. In this example, the TDD configuration #3 is set in the first radio frame. Then, the TDD configuration #1 is set immediately after the first radio frame. Also, in FIG. 11, timing of downlink data transmission in each HARQ process and timing of ACK and NACK transmission corresponding to downlink data are illustrated. That is, solid line arrows indicate a period from a downlink data transmission time to an ACK or NACK transmission time in the uplink in response to the downlink data. Also, dashed line arrows indicate a period from an ACK or NACK transmission time to a retransmission time of the above downlink data (or new data transmission time). The sum of the number of the dashed line arrows and the number of the arrows of the actual fight at a certain time point corresponds to the number of HARQ processes for downlink data at the certain time point.

The configuration #3 is set in the first radio frame of the example of FIG. 11, and therefore the maximum process number of HARQ of the downlink is 9. Hence, in the first radio frame, the base station and the terminal device are each provided with a memory region corresponding to the maximum process number 9, to transmit and receive downlink data. On the other hand, the configuration #1 is set in the second radio frame and the third radio frame, and therefore the maximum process number of HARQ of the downlink is 7. Hence, in the second radio frame and the third radio frame, the base station and the terminal device are each provided with a memory region corresponding to the maximum process number 7, to transmit and receive downlink data.

When the configuration #1 is newly set in the second radio frame, two existing HARQ processes are deleted, due to the maximum process number. Hence, in the immediately preceding first radio frame for which the configuration #1 is newly set, the downlink data is not transmitted in the deleted two HARQ processes. This is because, even if the base station transmits downlink data using these two HARQ processes, the base station is thereafter unable to receive an ACK or a NACK.

As a specific example, two HARQ processes for transmitting the downlink data are deleted in the subframe #8 and the subframe #9 of the first radio frame. Hence, in the subframe #8 and the subframe #9 of the first radio frame, the base station does not transmit the downlink data to a target terminal device. That is, the radio resources are not allocated in the subframe #8 and the subframe #9, to the target terminal device at least. As a result, it is possible that utilization loss of radio resources occurs in the subframe #8 and the subframe #9.

Also, even if the base station transmitted downlink data using the radio resources in the subframe #8 and the subframe #9, the base station would not receive an ACK or a NACK, and therefore the downlink data is retransmitted. Thereby, utilization loss of radio resources occurs in the subframe #8 and the subframe #9 after all.

Note that, in FIG. 11, the downlink data that newly occurs in the second radio frame and the third radio frame is not described, to circumvent complexity.

Figure 12:
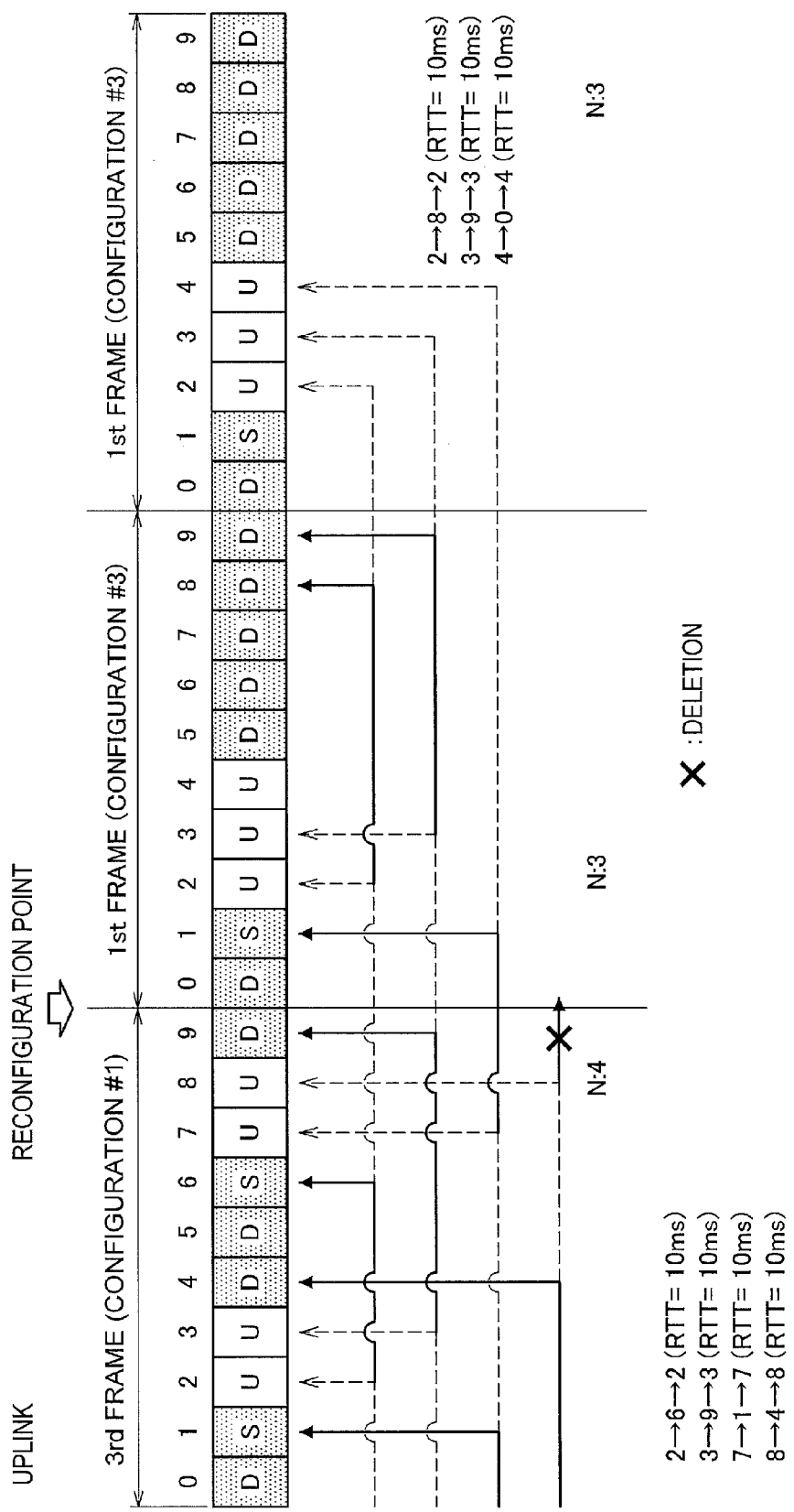
FIG. 12 is an explanatory diagram for describing an example of transmission and reception of uplink data in HARQ processes when a TDD configuration is set dynamically.

FIG. 12 is an explanatory diagram for describing an example of transmission and reception of uplink data in HARQ processes when the TDD configuration is set dynamically. Referring to FIG. 12, three radio frames and subframes included in the three radio frames are illustrated. In this example, the TDD configuration #1 is set in the first radio frame. Then, the TDD configuration #3 is set immediately after the first radio frame. Also, in FIG. 12, timing of uplink data transmission in each HARQ process and timing of ACK and NACK transmission corresponding to the uplink data are illustrated. That is, solid line arrows indicate a period from an uplink data transmission time to an ACK or NACK transmission time in the downlink in response to the uplink data. Also, dashed line arrows indicate a period from an ACK or NACK transmission time to a retransmission time of the above uplink data (or new data transmission time). The sum of the number of the dashed line arrows and the number of the arrows of the actual fight at a certain time point corresponds to the number of HARQ processes with respect to uplink data at the certain time point.

The configuration #1 is set in the first radio frame of the example of FIG. 12, and therefore the maximum process number of HARQ of the uplink is 4. Hence, in the first radio frame, the base station and the terminal device are each provided with a memory region corresponding to the maximum process number 4, to transmit and receive uplink data. On the other hand, the configuration #3 is set in the second radio frame and the third radio frame, and therefore the maximum process number of HARQ of the uplink is 3. Hence, in the second radio frame and the third radio frame, the base station and the terminal device are each provided with a memory region corresponding to the maximum process number 3, to transmit and receive uplink data.

When the configuration #3 is newly set in the second radio frame, one existing HARQ process is deleted, due to the maximum process number. Hence, in the immediately preceding first radio frame for which the configuration #3 is newly set, the uplink data is not transmitted in the deleted one HARQ process. This is because, even if the terminal device transmits uplink data using the one HARQ process, the terminal device is thereafter unable to receive an ACK or a NACK.

As a specific example, one HARQ process for transmitting uplink data is deleted in the subframe #8 of the first radio frame. Hence, in the subframe #8 of the first radio frame, the terminal device does not transmit the uplink data to the base station. That is, the radio resources are not allocated in the subframe #8, to the terminal device at least. As a result, it is possible that utilization loss of radio resources occurs in the subframe #8.

Also, even if the terminal device transmitted uplink data using the radio resources in the subframe #8, the terminal device would not receive an ACK or a NACK, and therefore the uplink data is retransmitted. Thereby, utilization loss of radio resources occurs in the subframe #8 after all.

Note that, in FIG. 12 as well, the uplink data that newly occurs in the second radio frame and the third radio frame is not described, to circumvent complexity.

As described above with reference to FIGS. 11 and 12, utilization loss of radio resources can occur, when the TDD configuration is set dynamically, in the method of the past. When the TDD configuration is frequently switched, such utilization loss of radio resources can become large particularly.

Thus, according to the embodiment of the present disclosure, the radio resources are utilized more effectively when the TDD configuration is set dynamically.

2. SCHEMATIC CONFIGURATION OF COMMUNICATION SYSTEM

Figure 13:
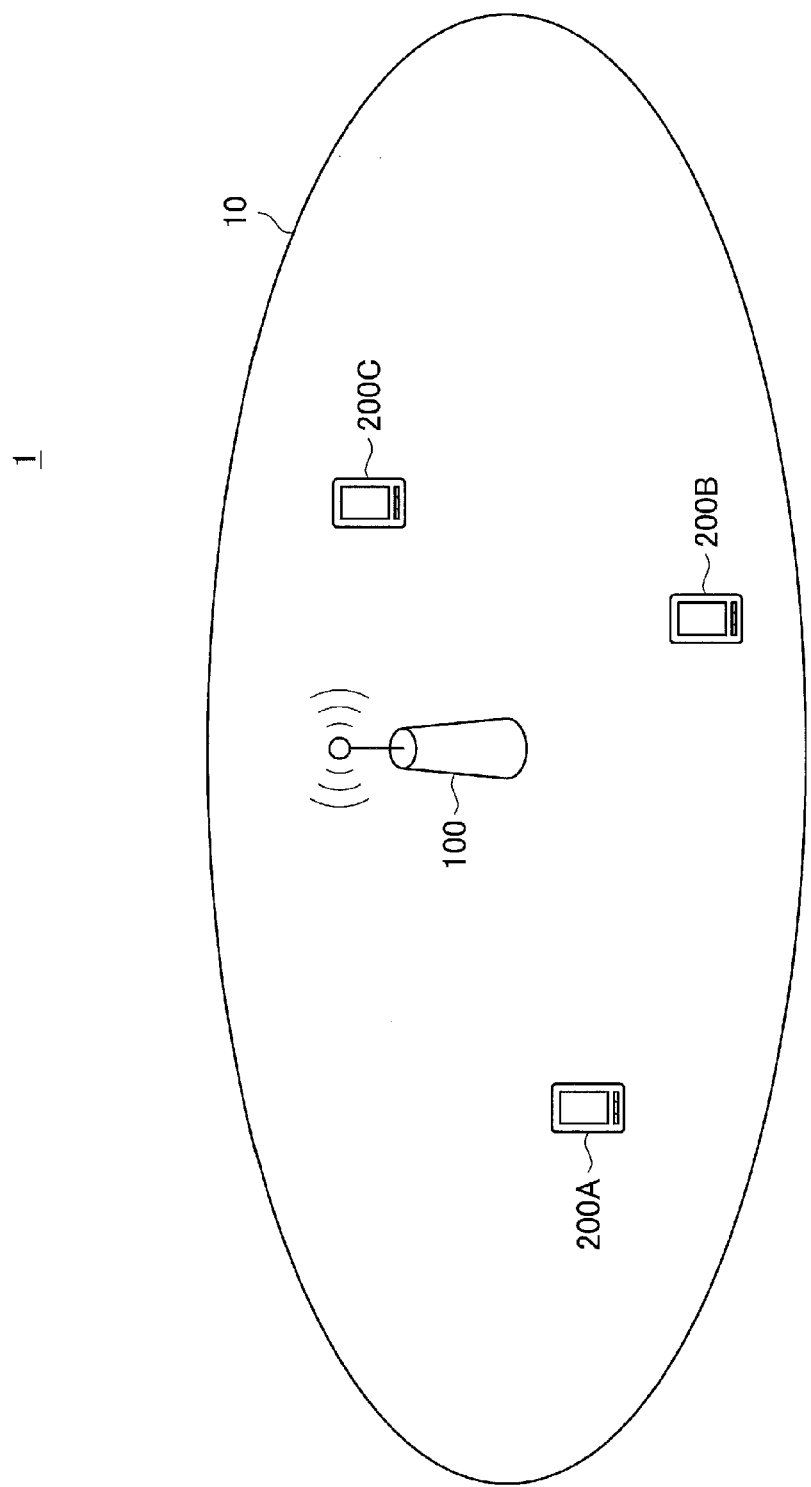
FIG. 13 is an explanatory diagram illustrating an example of a schematic configuration of a communication system according to an embodiment of the present disclosure.

First, with reference to FIG. 13, the schematic configuration of the communication system 1 according to the embodiment of the present disclosure will be described. FIG. 13 is an explanatory diagram illustrating an example of the schematic configuration of the communication system 1 according to the embodiment of the present disclosure. Referring to FIG. 13, the communication system 1 includes a base station 100 and terminal devices 200.

The base station 100 communicates wirelessly with each of the terminal devices 200 positioned in the cell 10. In other words, the terminal devices 200 communicate wirelessly with the base station 100, when positioned in the cell 10.

The base station 100 controls the radio communication in accordance with the TDD method. For example, the base station 100 allocates the radio resources of uplink and downlink in accordance with to the TDD method. Also, the base station 100 communicates wirelessly with the terminal devices 200 in accordance with the TDD method. Also, the terminal devices 200 also communicate wirelessly in accordance with the TDD method.

Also, the base station 100 sets a link direction configuration (hereinafter, referred to as "TDD configuration") indicating a link direction of each subframe, with respect to each frame including a plurality of subframes. For example, the base station 100 dynamically sets one of the seven TDD configurations illustrated in FIG. 2. Then, the base station 100 and the terminal devices 200 communicate wirelessly in accordance with the set TDD configuration.

Also, the base station 100 and the terminal devices 200 communicates wirelessly, using processes of automatic repeat request of a number which is equal to or smaller than the maximum number according to the setting of the TDD configuration. For example, the automatic repeat request is an HARQ, and the process is a HARQ process.

3. FIRST EMBODIMENT

First, the first embodiment of the present disclosure will be described. According to the first embodiment of the present disclosure, when the second TDD configuration is set after the first TDD configuration, the maximum number of the process number is adjusted during a predetermined period after setting the second TDD configuration. Thereby, the radio resources are utilized more effectively when the TDD configuration is set dynamically.

<3.1. Configuration of Base Station>

Figure 14:
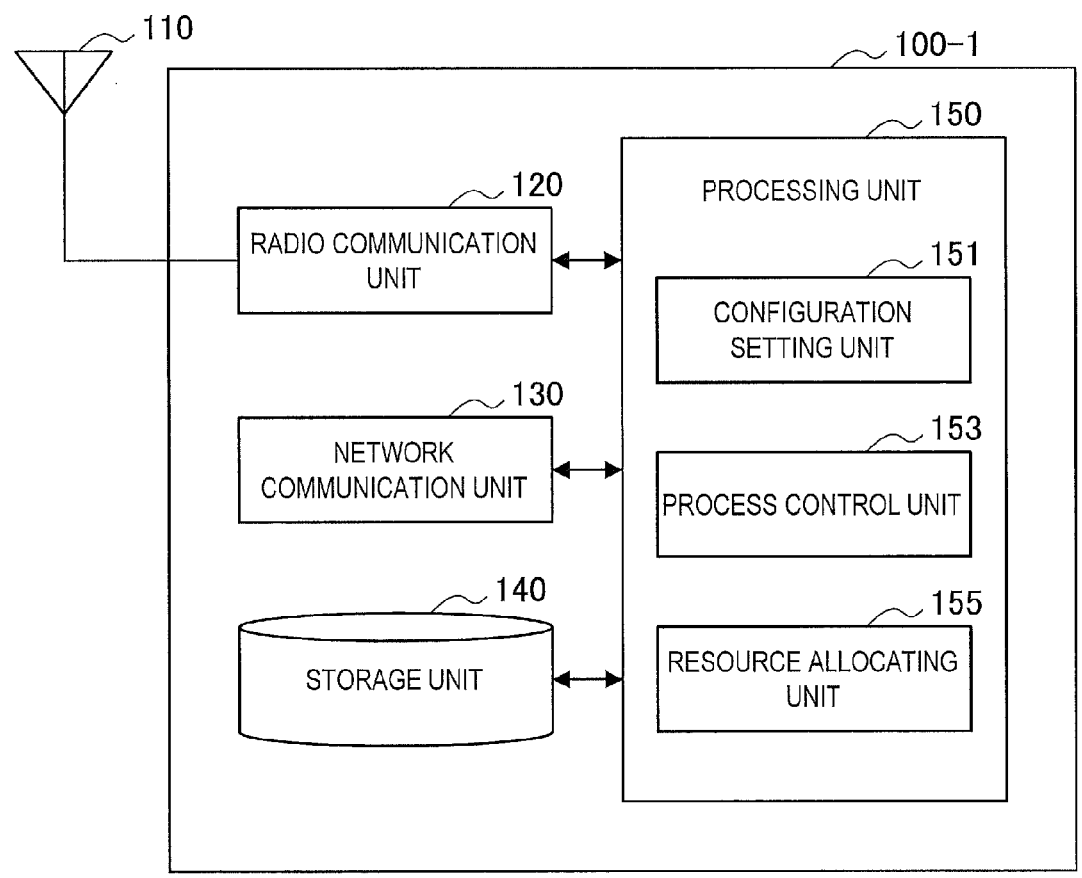
FIG. 14 is a block diagram illustrating an example of a configuration of a base station according to a first embodiment.
Figure 15:
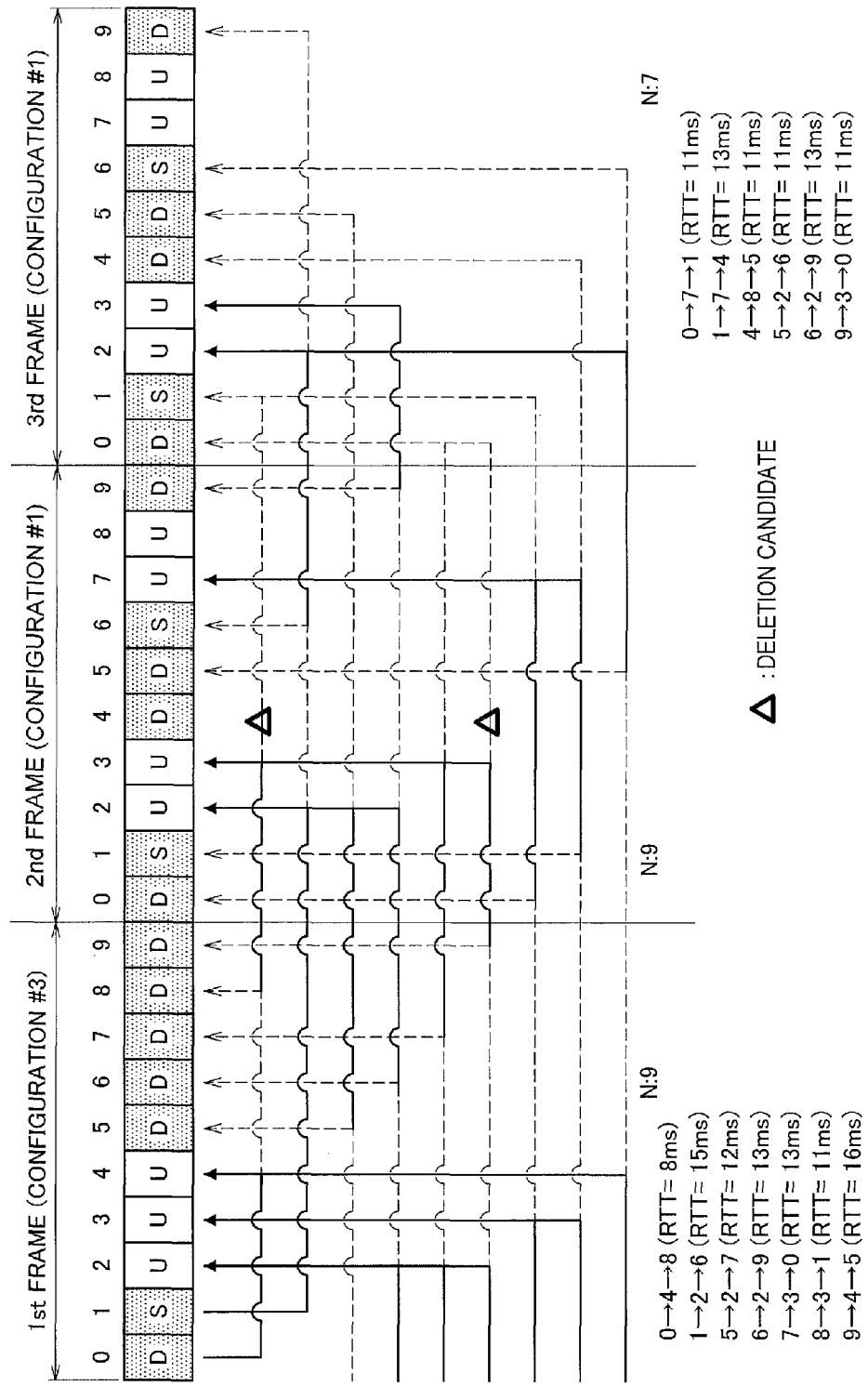
FIG. 15 is an explanatory diagram for describing an example of the number of HARQ processes with respect to downlink during a predetermined period after setting a TDD configuration, according to a first embodiment.
Figure 16:
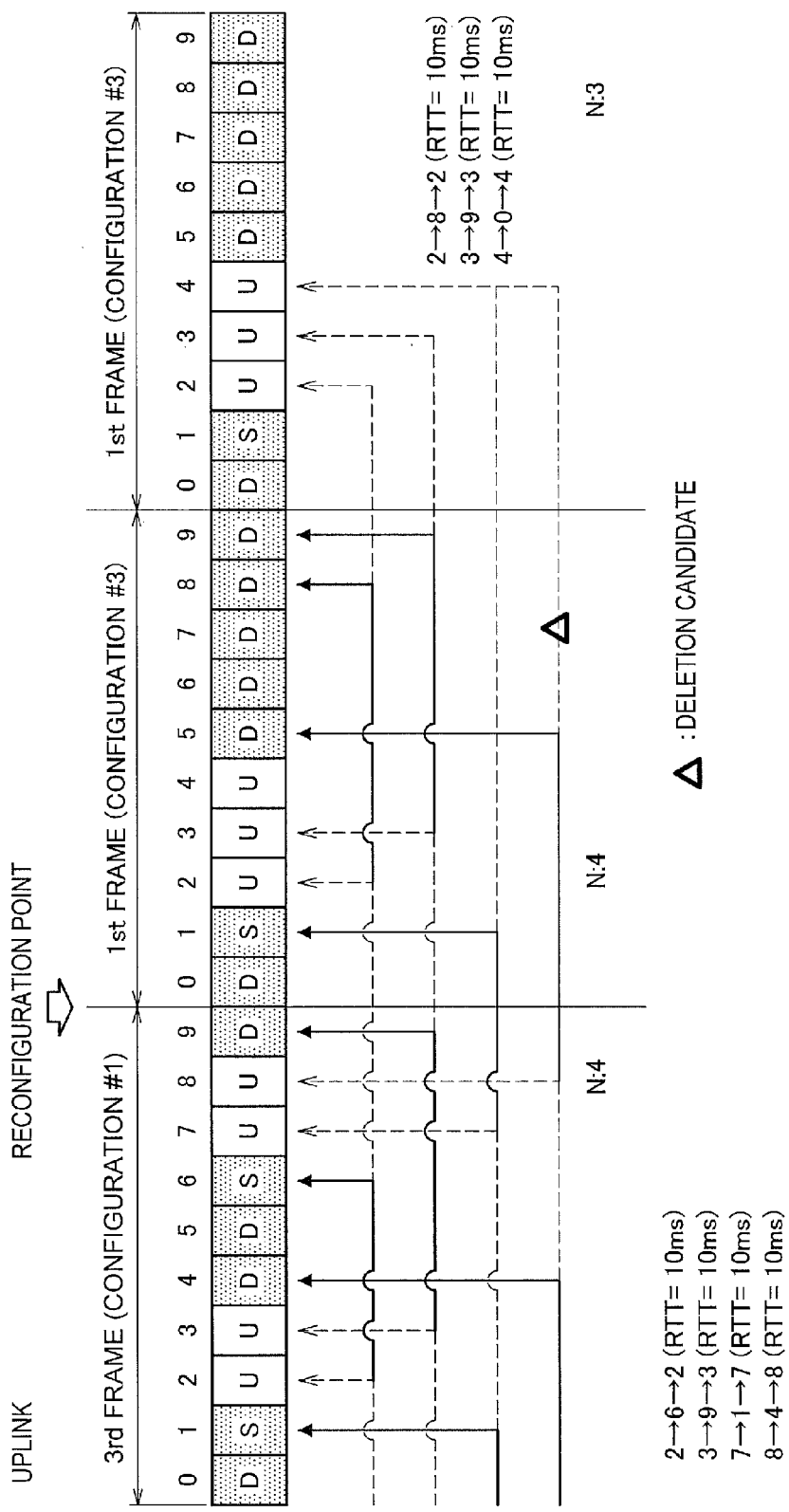
FIG. 16 is an explanatory diagram for describing an example of the number of HARQ processes with respect to uplink during a predetermined period after setting a TDD configuration, according to a first embodiment.

With reference to FIGS. 14 to 16, an example of the configuration of a base station 100-1 according to the first embodiment will be described. FIG. 14 is a block diagram illustrating an example of the configuration of the base station 100-1 according to the first embodiment. Referring to FIG. 14, the base station 100-1 includes an antenna 110, a radio communication unit 120, a network communication unit 130, a storage unit 140, and a processing unit 150.

(Antenna 110)

The antenna 110 transmits and receives signals. For example, the antenna 110 receives an uplink signal from the terminal devices 200, and outputs the received uplink signal to the radio communication unit 120. Also, the antenna 110 transmits a downlink signal output by the radio communication unit 120.

(Radio Communication Unit 120)

The radio communication unit 120 communicates wirelessly with the terminal devices 200 positioned in the cell 10. For example, the radio communication unit 120 transmits data to, and receives data from, the terminal devices 200, via the antenna unit 110.

In particular, the radio communication unit 120 communicates wirelessly in accordance with the TDD method. For example, the radio communication unit 120 transmits downlink data to the terminal devices 200, in a downlink subframe or a special subframe. Also, the radio communication unit 120 receives uplink data from the terminal devices 200, in an uplink subframe.

(Network Communication Unit 130)

The network communication unit 130 communicates with other devices. For example, the network communication unit 130 communicates with other base stations 100-1.

(Storage Unit 140)

The storage unit 140 stores programs and data for the operation of the base station 100-1.

(Processing Unit 150)

The processing unit 150 provides various functions of the base station 100-1. The processing unit 150 includes a configuration setting unit 151, a process control unit 153, and a resource allocating unit 155.

(Configuration Setting Unit 151)

The configuration setting unit 151 sets a TDD configuration indicating a link direction of each subframe, with respect to each frame including a plurality of subframes.

For example, the configuration setting unit 151 sets a first TDD configuration at a first time point. Then, radio communication is performed in accordance with the first TDD configuration at or after the first time point. Then, the configuration setting unit 151 sets the second TDD configuration at a subsequent second time point. Then, radio communication is performed in accordance with the second TDD configuration at or after the second time point. As described above, the configuration setting unit 151 switches the TDD configuration by setting a new TDD configuration.

Also, for example, the configuration setting unit 151 sets one of the seven TDD configurations illustrated in FIG. 2. As one example, the configuration setting unit 151 sets a TDD configuration #3 at the first time point, and sets a TDD configuration #1 at the subsequent second time point. That is, the TDD configuration is switched to the TDD configuration #1 from the TDD configuration #3.

Also, the maximum process number of the automatic repeat request is set in each TDD configuration. For example, the automatic repeat request is an HARQ. Specifically, for example, as illustrated in FIGS. 6 and 7, the maximum number of HARQ processes is set with respect to each TDD configuration.

Also, for example, the configuration setting unit 151 sets a TDD configuration according to the situation of traffic in the cell 11. More specifically, for example, when the uplink traffic increases in the cell 11, the configuration setting unit 151 sets a TDD configuration including more uplink subframes. As one example, the TDD configuration #1 of FIG. 2 is set. Also, for example, when the downlink traffic increases in the cell 11, the configuration setting unit 151 sets a TDD configuration including more downlink subframes. As one example, the TDD configuration #3 of FIG. 2 is set.

(Process Control Unit 153)

The process control unit 153 controls the process of automatic repeat request with respect to the terminal devices 200. For example, the automatic repeat request is an HARQ, and the process is a HARQ process. That is, the process control unit 153 controls the HARQ process with respect to the terminal devices 200. Also, the HARQ process includes an HARQ process for downlink data and an HARQ process with respect to uplink data.

Also, for example, the process control unit 153 transmits downlink data via the radio communication unit 120, using the HARQ process for downlink data, and receives an ACK or a NACK in response to the downlink data. Also, the process control unit 153 receives uplink data via the radio communication unit 120, using the HARQ process for uplink data, and transmits an ACK or a NACK in response to the uplink data. For example, the process control unit 153 includes the function of HARQ entity of the base station.

Also, in particular, in the first embodiment, the process control unit 153 controls the above HARQ process, in such a manner that the number of HARQ processes with respect to the terminal devices 200 is equal to or smaller than the maximum number according to the setting of TDD configuration.

Other Periods than a Predetermined Period after Setting a New TDD Configuration

First, for example, in other periods than a predetermined period after setting a new TDD configuration, the above maximum number according to the setting of the TDD configuration is the maximum process number of HARQ set with respect to the set TDD configuration. That is, in the above other periods, the process control unit 153 controls the above HARQ processes in such a manner that the number of HARQ processes with respect to the terminal devices 200 is equal to or smaller than the maximum process number of HARQ set with respect to the set TDD configuration.

As a specific example, the above maximum set with respect to the set TDD configuration is as described with reference to FIGS. 6 and 7. As illustrated in FIG. 6, with regard to downlink as one example, the maximum process number of HARQ set with respect to the TDD configuration #1 is 7. Thereby, when the TDD configuration #1 is set during other periods than the above predetermined period, the process control unit 153 controls the above HARQ processes in such a manner that the maximum number of HARQ processes is equal to or smaller than 7. Also, as illustrated in FIG. 7, with regard to uplink as one example, the maximum process number of HARQ set with respect to the TDD configuration #3 is 3. Thereby, when the TDD configuration #3 is set during other periods than the above predetermined period, the process control unit 153 controls the above HARQ processes in such a manner that the maximum number of HARQ processes is equal to or smaller than 3.

A Predetermined Period after Setting a New TDD Configuration

Second, during a predetermined period after setting a new TDD configuration, the above maximum number according to the setting of the TDD configuration is as described below For example, the second TDD configuration is set by the configuration setting unit 151 after the first TDD configuration. Then, for example, the first maximum process number of HARQ set with respect to the above first TDD configuration is larger than the second maximum process number of HARQ set with respect to the above second TDD configuration. In this case, the above maximum number according to the setting of the TDD configuration is larger than the above second maximum process number.

In other words, the maximum process number of HARQ set with respect to the TDD configuration is made smaller by the setting of the new TDD configuration. In this case, during a predetermined period after setting a new TDD configuration, the number of HARQ processes with respect to the terminal devices 200 can become larger than the maximum process number of HARQ set with respect to the new TDD configuration.

Thereby, even if the TDD configuration is set dynamically, the number of HARQ processes that are deleted when setting the new configuration can decrease. As a result, more HARQ processes are used immediately before setting the new TDD configuration, to transmit data. As a result, utilization loss of radio resources can decrease. That is, the radio resources are utilized more effectively. Thus, the throughput of the communication system 1 can improve.

Also, even if the TDD configuration is switched frequently, utilization loss of radio resources does not occur. Thereby, the throughput is improved more by switching the TDD configuration.

Further, for example, the above maximum number according to the setting of the TDD configuration is equal to or larger than the above first maximum process number during the above predetermined period.

In other words, the maximum process number of HARQ set with respect to the TDD configuration is made smaller by the setting of the new TDD configuration. In this case, during a predetermined period after setting a new TDD configuration, the number of HARQ processes with respect to the terminal devices 200 is same as, or more than, the maximum process number of HARQ set with respect to the previous TDD configuration.

Thereby, even if the TDD configuration is set dynamically, any HARQ process is not deleted when setting the new configuration. As a result, more HARQ processes are used immediately before setting the new TDD configuration, to transmit data. As a result, utilization loss of radio resources is eliminated. That is, the radio resources are utilized more effectively. Thus, the throughput of the communication system 1 can improve.

Further, for example, the above maximum number according to the setting of the TDD configuration is the above first maximum process number during the above predetermined period.

In other words, the maximum process number of HARQ set with respect to the TDD configuration is made smaller by the setting of the new TDD configuration. In this case, during a predetermined period after setting a new TDD configuration, the number of HARQ processes with respect to the terminal devices 200 can be same as the maximum process number of HARQ set with respect to the previous TDD configuration.

Thereby, even if the TDD configuration is set dynamically, the number of HARQ processes is maintained when setting the new configuration. As a result, more HARQ processes are used immediately before setting the new TDD configuration, to transmit data. As a result, utilization loss of radio resources is eliminated. That is, the radio resources are utilized more effectively. Thus, the throughput of the communication system 1 can improve. Further, the number of HARQ processes is reduced to the necessary and sufficient number, and therefore the process amount and the memory region are saved.

Also, for example, the above predetermined period is a period that is equal to or shorter than one frame after setting the above second TDD configuration. More specifically, for example, the above predetermined period is a period from the setting of the above second TDD configuration to the end of transmission and reception of an ACK or a NACK in response to the data transmitted and received while setting the first TDD configuration.

Thereby, the period in which the number of TDD configurations is large is limited to a necessary and sufficient period. Thereby, the process amount and the memory region are saved when setting a new configuration.

As described above, during a predetermined period after setting a new TDD configuration, the HARQ process is controlled. In the following, a specific example of this point will be described with reference to FIGS. 15 and 16.

FIG. 15 is an explanatory diagram for describing an example of the number of HARQ processes with respect to downlink during a predetermined period after setting a TDD configuration, according to the first embodiment. Referring to FIG. 15, the TDD configuration #3 is set in the first radio frame, in the same way as the example of FIG. 11. Then, the TDD configuration #1 is set, immediately after the first radio frame. Also, solid line arrows indicate a period from a downlink data transmission time to an ACK or NACK transmission time in the uplink in response to the downlink data. Also, dashed line arrows indicate a period from an ACK or NACK transmission time to a retransmission time of the above downlink data (or new data transmission time). The sum of the number of the dashed line arrows and the number of the arrows of the actual fight at a certain time point corresponds to the number of HARQ processes for downlink data at the certain time point.

The configuration #3 is set in the first radio frame of the example of FIG. 15, and therefore the maximum process number of HARQ of the downlink is 9. Hence, in the first radio frame, the base station and the terminal device are each provided with a memory region corresponding to the maximum process number 9, to transmit and receive downlink data. This point is same as the example illustrated in FIG. 11.

In particular, according to the first embodiment, in the second radio frame of the example of FIG. 15, the configuration #1 is set, but the maximum process number of HARQ of the downlink is maintained at 9. Then, in the third radio frame, the maximum process number of HARQ of the downlink becomes the maximum process number 7 set with respect to the configuration #1.

Thereby, for example, two HARQ processes for transmitting the downlink data in the subframe #8 and the subframe #9 of the first radio frame are deleted after ACK and NACK transmission time in the second radio frame. Hence, transmission of downlink data in the above two HARQ processes is enabled in the subframe #8 and the subframe #9 of the radio frame in the first radio frame. As a result, the radio resources are utilized more effectively.

FIG. 16 is an explanatory diagram for describing an example of the number of HARQ processes with respect to uplink during a predetermined period after setting the TDD configuration, according to the first embodiment. Referring to FIG. 16, the TDD configuration #1 is set in the first radio frame, in the same way as the example of FIG. 12. Then, the TDD configuration #3 is set immediately after the first radio frame. Also, solid line arrows indicate a period from an uplink data transmission time to an ACK or NACK transmission time in the downlink in response to the uplink data. Also, dashed line arrows indicate a period from an ACK or NACK transmission time to a retransmission time of the above uplink data (or new data transmission time). The sum of the number of the dashed line arrows and the number of the arrows of the actual fight at a certain time point corresponds to the number of HARQ processes for uplink data at the certain time point.

The configuration #1 is set in the first radio frame of the example of FIG. 16, and therefore the maximum process number of HARQ of the uplink is 4. Hence, in the first radio frame, the base station and the terminal device are each provided with a memory region corresponding to the maximum process number 4, to transmit and receive downlink data. This point is same as the example illustrated in FIG. 12.

In particular, according to the second embodiment, in the second radio frame of the example of FIG. 16, the configuration #3 is set, but the maximum process number of HARQ of uplink is maintained at 4. Then, in the third radio frame, the maximum process number of HARQ of uplink becomes the maximum process number 3 set with respect to the configuration #3.

Thereby, for example, one HARQ process for transmitting the uplink data in the subframe #8 of the first radio frame is deleted after ACK and NACK transmission time in the second radio frame. Hence, in the subframe #8 of the radio frame in the first radio frame, transmission of uplink data in the above one HARQ process is enabled. As a result, the radio resources are utilized more effectively.

For example, as in the above specific example, the HARQ process is maintained in one frame after setting a new TDD configuration, and the radio resources are effectively utilized in one frame immediately before setting the new TDD configuration.

Note that, as a matter of course, it is possible that the first maximum process number of HARQ set with respect to the above first TDD configuration is equal to or smaller than the second maximum process number of HARQ set with respect to the above second TDD configuration. In this case, for example, during the above predetermined period as well, the above maximum number according to the setting of the TDD configuration is the above second maximum process number, in the same way as other periods than the predetermined period.

Specific Control Process

For example, the process control unit 153 controls the HARQ process of the base station in such a manner that the number of HARQ processes of the base station with respect to each terminal device 200 is equal to or smaller than the maximum number according to the setting of the TDD configuration.

Specifically, for example, the process control unit 153 adds, deletes, or maintains the HARQ process in such a manner that the number of HARQ processes of the base station with respect to each terminal device 200 is equal to or smaller than the above maximum number.

Also, for example, the process control unit 153 may also control the HARQ process of the terminal device in such a manner that the number of HARQ processes of the terminal device with respect to each terminal device 200 is equal to or smaller than the maximum number according to the setting of the TDD configuration.

Specifically, the process control unit 153 may notify the terminal devices 200 of the new TDD configuration, via the radio communication unit 120. For example, the process control unit 153 may notify the new TDD configuration using system information. Thereby, the terminal devices 200 may control the HARQ process of the terminal device in such a manner that the number of HARQ processes of the terminal device is equal to or smaller than the maximum number according to the setting of the TDD configuration. Note that, instead of the system information or in addition to the system information, the process control unit 153 may notify the new TDD configuration, using individual signaling to a terminal device (for example, radio resources control (RRC) signaling).

(Resource Allocating Unit 155)

The resource allocating unit 155 allocates radio resources to the terminal devices 200 positioned in the cell 10. For example, when the communication system 1 is compliant with LTE or LTE-Advanced, the resource allocating unit 155 allocates one or more resource blocks to the terminal devices 200 positioned in the cell 10, with respect to each subframe.

For example, the resource allocating unit 155 allocates radio resources to the terminal devices 200, in the same way as other periods, in the period before a predetermined period after setting a new TDD configuration (for example, the period immediately before setting a new TDD configuration) as well. As described above, during the above predetermined period, HARQ processes are not deleted, and therefore an ACK and a NACK can be transmitted. As a result, even during the period before the above predetermined period, data transmission using all HARQ processes (i.e., data transmission in all subframes) is performed.

<3.2. Configuration of Terminal Device>

Figure 17:
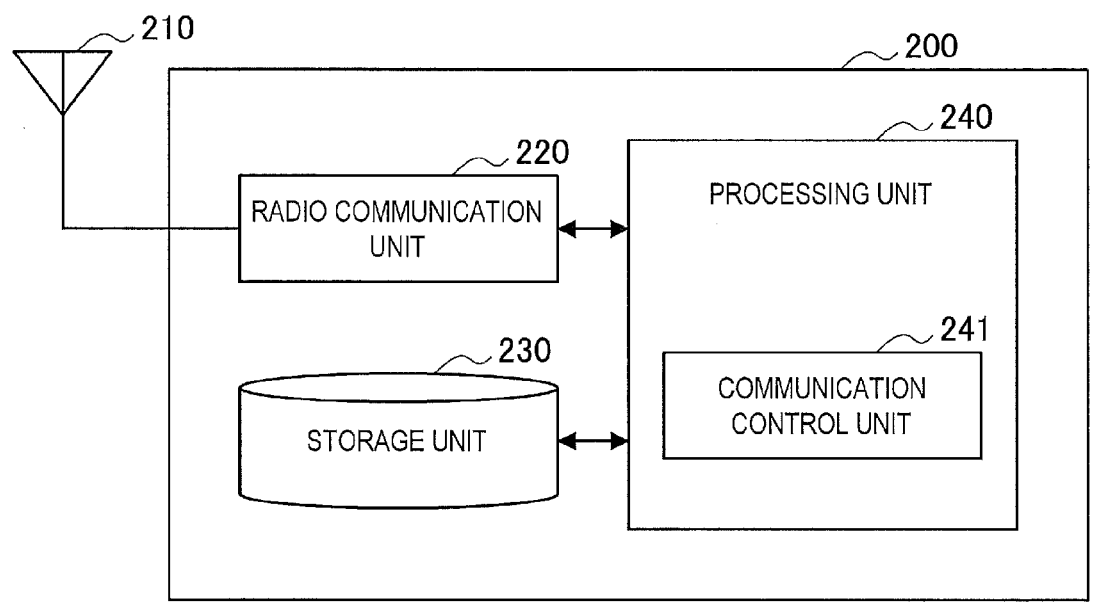
FIG. 17 is a block diagram illustrating an example of a configuration of a terminal device according to a first embodiment.

With reference to FIG. 17, an example of the configuration of the terminal devices 200 according to the first embodiment will be described. FIG. 17 is a block diagram illustrating an example of the configuration of the terminal devices 200 according to the first embodiment. Referring to FIG. 17, the terminal devices 200 includes an antenna 210, a radio communication unit 220, a storage unit 230 and a processing unit 240.

(Antenna 210)

The antenna 210 transmits and receives signals. For example, the antenna 210 receives the downlink signal from the base station 100-1, and outputs the received downlink signal to the radio communication unit 220. Also, the antenna 110 transmits an uplink signal output by the radio communication unit 120.

(Radio Communication Unit 220)

When the terminal devices 200 are positioned in the cell 10, the radio communication unit 220 communicates wirelessly with the base station 100-1. For example, the radio communication unit 220 transmits data to, and receives data from, the base station 100-1 via the antenna unit 210.

In particular, the radio communication unit 220 communicates wirelessly in accordance with the TDD method. For example, the radio communication unit 220 receives downlink data from the base station 100-1, in a downlink subframe or a special subframe. Also, the radio communication unit 120 transmits uplink data to the base station 100-1, in an uplink subframe.

(Storage Unit 230)

The storage unit 230 stores programs and data for the operation of the terminal devices 200.

(Processing Unit 240)

The processing unit 240 provides various functions of the terminal devices 200. The processing unit 240 includes a communication control unit 241.

(Communication Control Unit 241)

The communication control unit 241 controls radio communication by the terminal devices 200.

Radio Communication in Accordance with TDD Configuration

First, when a TDD configuration is set, the communication control unit 241 controls radio communication in accordance with the set TDD configuration.

Specifically, for example, the communication control unit 241 causes the radio communication unit 220 to transmit the downlink data and the control information (or the control signal) in the downlink subframe and the special subframe in the TDD configuration. Also, for example, the communication control unit 241 causes the radio communication unit 220 to receive the uplink data and the control information (or the control signal) in the uplink in the TDD configuration.

Also, for example, when the base station 100 notifies the new TDD configuration via the radio communication unit 220, the communication control unit 241 controls the radio communication in accordance with the new TDD configuration notified.

Control of HARQ Process

Second, the communication control unit 241 controls the process of automatic repeat request with respect to the terminal devices 200. The automatic repeat request is an HARQ, and the process is a HARQ process of a terminal device. That is, the communication control unit 241 controls the HARQ process of the terminal device with respect to the terminal devices 200.

Also, for example, the communication control unit 241 receives downlink data via the radio communication unit 220, using the HARQ process for the downlink data, and transmits an ACK or a NACK in response to the downlink data. Also, the communication control unit 241 transmits uplink data via the radio communication unit 120, using the HARQ process for the uplink data, and receives an ACK or a NACK in response to the uplink data. For example, the communication control unit 241 includes the function of HARQ entity of a terminal device.

Also, in particular, in the first embodiment, the communication control unit 241 controls the above HARQ processes in such a manner that the number of HARQ processes with respect to the terminal devices 200 is equal to or smaller than the maximum number according to the setting of the TDD configuration. This point is as described in the base station 100-1.

Also, as a specific process, for example, the communication control unit 241 adds, deletes, or maintains the HARQ process in such a manner that the number of HARQ processes of the terminal device with respect to the terminal devices 200 is equal to or smaller than the above maximum number.

<3.3. Flow of Process>

Next, with reference to FIG. 18 and FIG. 19, an example of the communication control process according to the first embodiment will be described.

(Process of Base Station)

Figure 18:
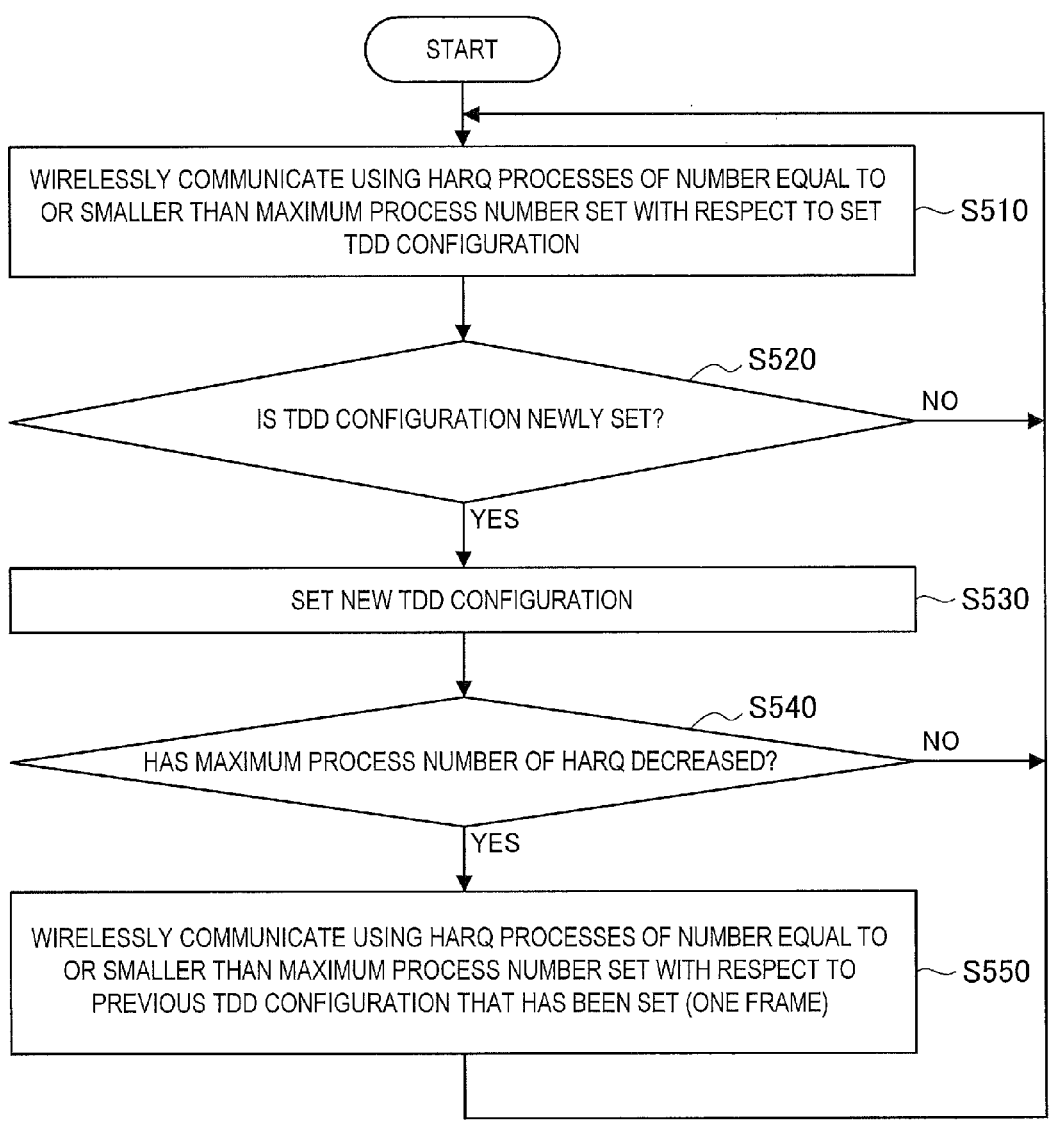
FIG. 18 is a flowchart illustrating an example of a schematic flow of a communication control process of a base station according to a first embodiment.

FIG. 18 is a flowchart illustrating an example of the schematic flow of the communication control process of the base station according to the first embodiment.

In step S510, the process control unit 153 communicates wirelessly via the radio communication unit 120, using the HARQ processes of a number that is equal to or smaller than the maximum process number set with respect to the set TDD configuration.

In step S520, the configuration setting unit 151 determines whether to set a new TDD configuration. If a TDD configuration is newly set, the process proceeds to step S530. Otherwise, the process returns to step S510.

In step S530, the configuration setting unit 151 sets a new TDD configuration.

In step S540, the process control unit 153 determines whether the maximum process number of HARQ set with respect to the previous TDD configuration that has been set is larger than the maximum process number of HARQ set with respect to the newly set TDD configuration. That is, the process control unit 153 determines whether the maximum process number of HARQ set with respect to the TDD configuration has decreased, on the basis of the new setting of the TDD configuration. If the maximum process of HARQ has decreased, the process proceeds to step S550. Otherwise, the process returns to step S510.

In step S550, during one frame after setting a new TDD configuration, the process control unit 153 communicates wirelessly via the radio communication unit 120, using HARQ processes of a number equal to or smaller than the maximum process number set with respect to the previous TDD configuration that has been set. Then, the process returns to step S510.

(Process of Terminal Device)

Figure 19:
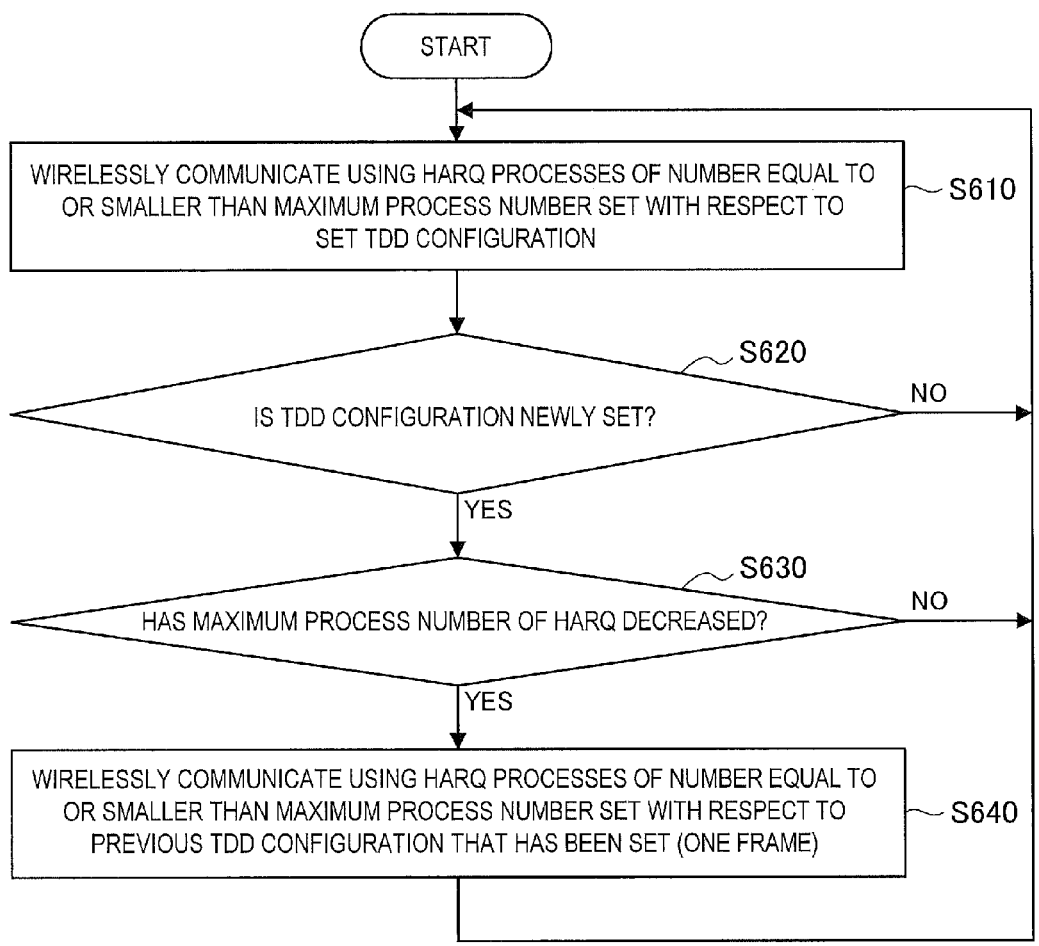
FIG. 19 is a flowchart illustrating an example of a schematic flow of a communication control process of a terminal device according to a first embodiment.

FIG. 19 is a flowchart illustrating an example of the schematic flow of the communication control process of the terminal device according to the first embodiment.

In step S610, the communication control unit 241 communicates wirelessly via the radio communication unit 220, using HARQ processes of a number equal to or smaller than the maximum process number set with respect to the set TDD configuration.

In step S620, the communication control unit 241 determines whether a new TDD configuration is set. For example, the communication control unit 241 determines whether a new TDD configuration is set, on the basis of system information (or, RRC signaling) transmitted by the base station 100-1. If a TDD configuration is newly set, the process proceeds to step S630. Otherwise, the process returns to step S610.

In step S630, the communication control unit 241 determines whether the maximum process number of HARQ set with respect to the previous TDD configuration that has been set is larger than the maximum process number of HARQ set with respect to the newly set TDD configuration. That is, the communication control unit 241 determines whether the maximum process number of HARQ set with respect to the TDD configuration has decreased, on the basis of the new setting of the TDD configuration. If the maximum process of HARQ has decreased, the process proceeds to step S640. Otherwise, the process returns to step S610.

In step S640, during one frame after setting a new TDD configuration, the communication control unit 241 communicates wirelessly via the radio communication unit 220, using HARQ processes of a number equal to or smaller than the maximum process number set with respect to the previous TDD configuration that has been set. Then, the process returns to step S610.

In the above, the first embodiment of the present disclosure has been described. As described above, according to the first embodiment, the radio resources are utilized more effectively when the TDD configuration is set dynamically. As a result, the throughput can improve in the communication system 1.

4. SECOND EMBODIMENT

Next, the second embodiment of the present disclosure will be described. According to the second embodiment of the present disclosure, it is determined whether or not each of a plurality of terminal devices has a function to adjust the maximum number of HARQ processes during the above predetermined period. Then, a process is executed based on the result of this determination. Thereby, the radio resources are utilized more effectively, even when terminal devices that do not have the above function and the terminal devices 200 that have the function are mixed in the cell 10.

<4.1. Configuration of Base Station>

Figure 20:
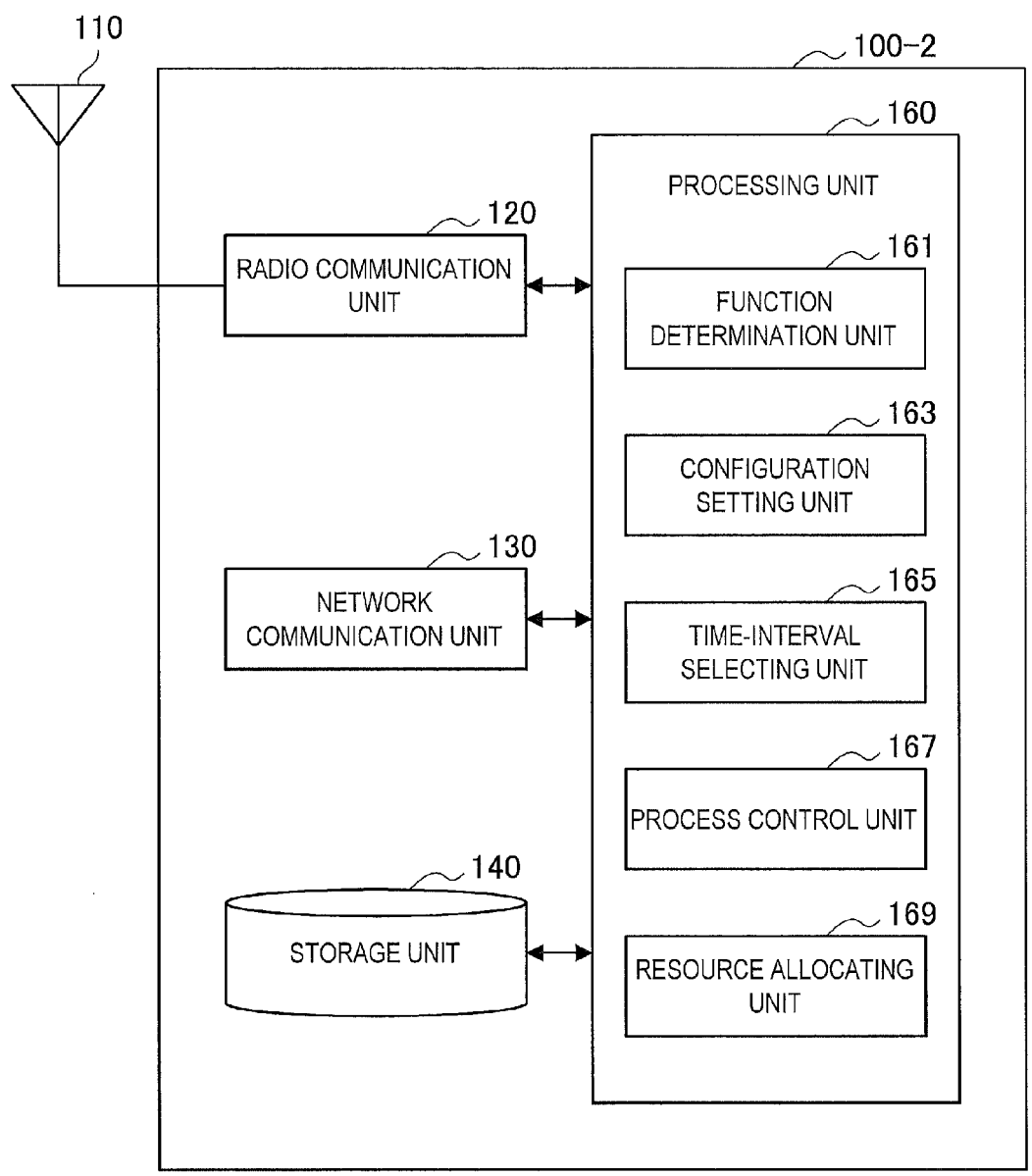
FIG. 20 is a block diagram illustrating an example of a configuration of a base station according to a second embodiment.

With reference to FIG. 20, an example of the configuration of the base station 100-2 according to the second embodiment will be described. FIG. 20 is a block diagram illustrating an example of the configuration of the base station 100-2 according to the second embodiment. Referring to FIG. 20, the base station 100-2 includes an antenna 110, a radio communication unit 120, a network communication unit 130, a storage unit 140, and a processing unit 160.

Here, there is no difference between the first embodiment and the second embodiment, with respect to the antenna 110, the radio communication unit 120, the network communication unit 130, and the storage unit 140. Thus, here, the processing unit 160 will be described.

(Processing Unit 160)

The processing unit 160 provides various functions of the base station 100-2.

The processing unit 160 includes a function determination unit 161, a configuration setting unit 163, a time-interval selecting unit 165, a process control unit 167, and a resource allocating unit 169.

(Function Determination Unit 161)

The function determination unit 161 determines whether each of a plurality of terminal devices that communicate wirelessly has the function (hereinafter, referred to as "maximum process number adjustment function") for making the maximum number of HARQ processes larger than the maximum process number set with respect to a new configuration during a predetermined period after setting the new configuration.

For example, the function determination unit 161 determines whether each of the above plurality of terminal devices has the maximum process number adjustment function, on the basis of a result to an inquiry through individual signaling to each of the above plurality of terminal devices. More specifically, for example, the function determination unit 161 performs RRC signaling for inquiring presence or absence of the maximum process number adjustment function, to the terminal devices positioned in the cell 11, via the radio communication unit 120. Then, the function determination unit 161 is notified of presence or absence of the maximum process number adjustment function from the terminal devices, via the radio communication unit 120. Then, the function determination unit 161 determines whether each of a plurality of terminal devices is a terminal device that has the maximum process number adjustment function or a terminal device that does not have the maximum process number adjustment function (hereinafter, referred to as "legacy terminal device"), on the basis of the notification.

Also, for example, the function determination unit 161 calculates the proportion of the terminal devices that have the maximum process number adjustment function 200, among the above plurality of terminal devices.

Note that, for example, the terminal devices have a set of the dynamic TDD configuration setting function and the maximum process number adjustment function. In this case, the inquiry by individual signaling may inquire presence or absence of the maximum process number adjustment function indirectly, by inquiring whether the terminal devices have dynamic TDD configuration setting function for example, instead of inquiring presence or absence of the maximum process number adjustment function directly.

(Configuration Setting Unit 163)

The configuration setting unit 163 sets a TDD configuration indicating a link direction of each subframe, with respect to each frame including a plurality of subframes.

For example, the configuration setting unit 163 sets a first TDD configuration at a first time point, and sets a second TDD configuration at a subsequent second time point. This point is as described in the first embodiment.

Also, for example, the configuration setting unit 163 sets one of the seven TDD configurations illustrated in FIG. 2. Also, for example, the maximum process number of an automatic repeat request (for example, an HARQ) is set in each TDD configuration. Also, for example, the configuration setting unit 163 sets a TDD configuration in response to the situation of traffic in the cell 11. These points are as described in the first embodiment.

Also, in particular, in the second embodiment, the configuration setting unit 163 sets a TDD configuration on the basis of a result of determination of whether each of a plurality of terminal devices has the maximum process number adjustment function. For example, the configuration setting unit 163 sets a TDD configuration according to the proportion of one or more terminal devices 200 having the maximum process number adjustment function among the above plurality of terminal devices.

More specifically, for example, the above proportion is lower than a predetermined proportion. In this case, the configuration setting unit 163 sets a new TDD configuration in such a manner that the difference between the maximum process number set with respect to the existing TDD configuration and the maximum process number set with respect to the newly set TDD configuration is equal to or smaller than a predetermined number. In other words, when the proportion of the terminal devices that have the maximum process number adjustment function 200 is low, the configuration setting unit 163 switches the TDD configuration so as not to change the maximum process number largely.

As one example, when the above proportion lower than a predetermined proportion, one of the TDD configurations #1 to #3 is set. For example, when the TDD configuration #3 is set, the TDD configuration #1 or #2 is set as a new TDD configuration, or the TDD configuration #3 is maintained. With this setting, the maximum number of HARQ processes for downlink data and the maximum number of HARQ processes for uplink link the data do not change largely.

With this setting, when the number of the terminal devices that have the maximum process number adjustment function 200 is small, i.e., when the legacy terminal device is many, the number of HARQ processes deleted in the legacy terminal device can be small. As a result, utilization loss of radio resources can be smeller. That is, the radio resources are utilized more effectively. Thus, the throughput can improve in the communication system 1.

Also, for example, the configuration setting unit 163 sets a TDD configuration at time intervals selected by the time-interval selecting unit 165.

(Time Interval Selecting Unit 165)

The time-interval selecting unit 165 selects a time interval of setting a TDD configuration, on the basis of a result of determination of whether each of a plurality of terminal devices has the maximum process number adjustment function. For example, the time-interval selecting unit 165 selects the above time interval, according to the proportion of one or more terminal devices 200 having the maximum process number adjustment function among the above plurality of terminal devices.

More specifically, for example, the time-interval selecting unit 165 selects a first time interval when the above proportion is a first proportion, and selects the above first time interval or a second time interval which is longer than the first time interval when the above proportion is a second proportion which is lower than the above first proportion. In other words, the time-interval selecting unit 165 switches the TDD configuration with high frequency when the proportion of the terminal devices that have the maximum process number adjustment function 200 is large, and switches the TDD configuration with low frequency when the above proportion is small.

As described above, when the terminal devices that have the maximum process number adjustment function 200 are many, the TDD configuration is switched optimally with high frequency, to improve the throughput.

Also, when the terminal devices that have the maximum process number adjustment function 200 is few, the TDD configuration is switched with low frequency, to prevent HARQ processes from being deleted in legacy terminal devices. As a result, utilization loss of radio resources can be smaller. That is, the radio resources are utilized more effectively. Thus, the throughput can improve in the communication system 1.

(Process Control Unit 167)

The process control unit 167 controls the process of the automatic repeat request with respect to each of a plurality of terminal devices that communicate wirelessly. For example, the process control unit 167 controls the HARQ process with respect to each of a plurality of terminal devices.

Also, for example, the process control unit 167 transmits data to, and receives data from, each of the plurality of terminal devices, using the HARQ process of each of the above plurality of terminal devices. For example, the process control unit 167 transmits the downlink data to a first terminal device via the radio communication unit 120, using the HARQ process for downlink data of the first terminal device, and receives an ACK or a NACK from the first terminal device in response to the downlink data. Also, for example, the process control unit 167 receives uplink data from the first terminal device via the radio communication unit 120, using the HARQ process for the uplink data of the first terminal device, and transmits an ACK or a NACK to the first terminal device in response to the uplink data.

Also, in particular, in the second embodiment, the process control unit 167 controls the above process with respect to each of one or more terminal devices in such a manner that the number of HARQ processes with respect to each of the one or more terminal devices 200 having the maximum process number adjustment function among a plurality of terminal devices is equal to or smaller than the maximum number according to the setting of the TDD configuration. That is, the maximum number of HARQ processes is adjusted, in the same way as the first embodiment, with respect to each of one or more terminal devices 200 having the maximum process number adjustment function among a plurality of terminal devices. The specific method is as described in the first embodiment.

Thereby, even when the legacy terminal devices that do not have the maximum process number adjustment function and the terminal devices 200 that have the function are mixed in the cell 10, the radio resources are utilized more effectively.

Note that, with respect to each of one or more legacy terminal devices among a plurality of terminal devices, the above maximum number is the maximum process number of HARQ set with respect to the set TDD configuration, for example.

(Resource Allocating Unit 169)

The resource allocating unit 169 allocates radio resources to the terminal devices 200 positioned in the cell 10. For example, when the communication system 1 is compliant with LTE or LTE-Advanced, the resource allocating unit 169 allocates one or more resource blocks to the terminal devices 200 positioned in the cell 10, with respect to each subframe.

In particular, in the second embodiment, the resource allocating unit 169 allocates, to a plurality of terminal devices, the radio resources during the period before a predetermined period after setting a new TDD configuration, on the basis of a result of determination of whether each of the plurality of terminal devices has the maximum process number adjustment function. For example, the above predetermined period is one frame after setting a new TDD configuration, and the above period before the predetermined period is one frame immediately before the predetermined period (i.e., one frame immediately before setting a new TDD configuration).

Specifically, for example, the resource allocating unit 169 more preferentially allocates the radio resources during the above period before the above predetermined period, to the above one or more terminal devices 200 having the maximum process number adjustment function, rather than one or more legacy terminal devices among a plurality of terminal devices. That is, the radio resources in one frame immediately before setting a new TDD configuration are allocated more preferentially to the terminal devices that have the maximum process number adjustment function 200, rather than the legacy terminal devices. As one example, radio resources are allocated to the terminal devices 200, and thereafter the remaining radio resources are allocated to the legacy terminal devices.

In such allocation, radio resources are allocated preferentially to the terminal devices 200 that can transmit data using more HARQ processes, rather than the legacy terminal devices, during the period immediately before setting a new TDD configuration. As a result, utilization loss of radio resources can be smaller. That is, the radio resources are utilized more effectively. Thus, the throughput can improve in the communication system 1.

Note that the resource allocating unit 169 may allocate radio resources of an amount equal to or smaller than the amount corresponding to the maximum process number set with respect to a newly set TDD configuration among the radio resources during the above period before the above predetermined period, to one or more legacy terminal devices. For example, in the example illustrated in FIG. 11, the above predetermined period is a second radio frame, and the above period before the above predetermined period is a first radio frame. Then, the newly set TDD configuration is the TDD configuration #1, and the maximum process number set with respect to the TDD configuration #1 is 7. In this case, the radio resources in 7 subframes or less (i.e., 7 transport blocks or less) among the radio resources in the first radio frame may be allocated to the legacy terminal devices.

<4.2. Flow of Process>

Next, with reference to FIGS. 21 and 22, an example of communication control process according to the second embodiment will be described. A first communication control process and a second communication control process, which are described below, can be executed at different time intervals in parallel.

(First Communication Control Process)

Figure 21:
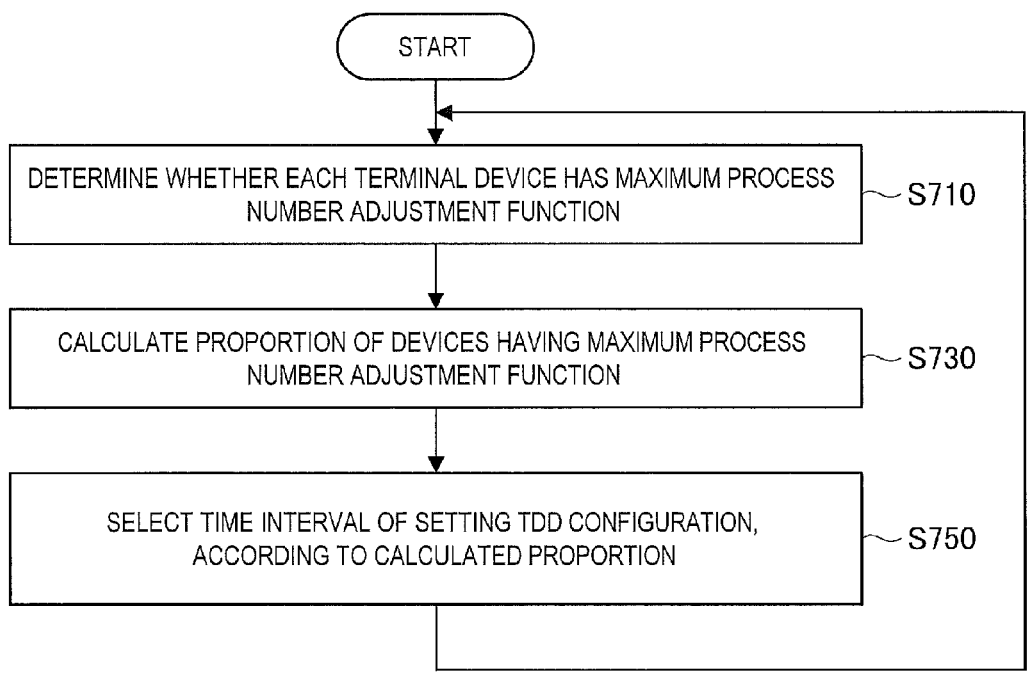
FIG. 21 is a flowchart illustrating an example of a schematic flow of a first communication control process of a base station according to a second embodiment.

FIG. 21 is a flowchart illustrating an example of the schematic flow of the first communication control process of the base station according to the second embodiment.

In step S710, the function determination unit 161 determines whether each of a plurality of terminal devices has the maximum process number adjustment function.

In step S720, the function determination unit 161, calculates the proportion of, the terminal devices that have the maximum process number adjustment function 200 among the above plurality of terminal devices.

In step S730, the time-interval selecting unit 165 selects a time interval for setting the TDD configuration, according to the above calculated proportion. Then, the process returns to step S710.

(Second Communication Control Process)

Figure 22:
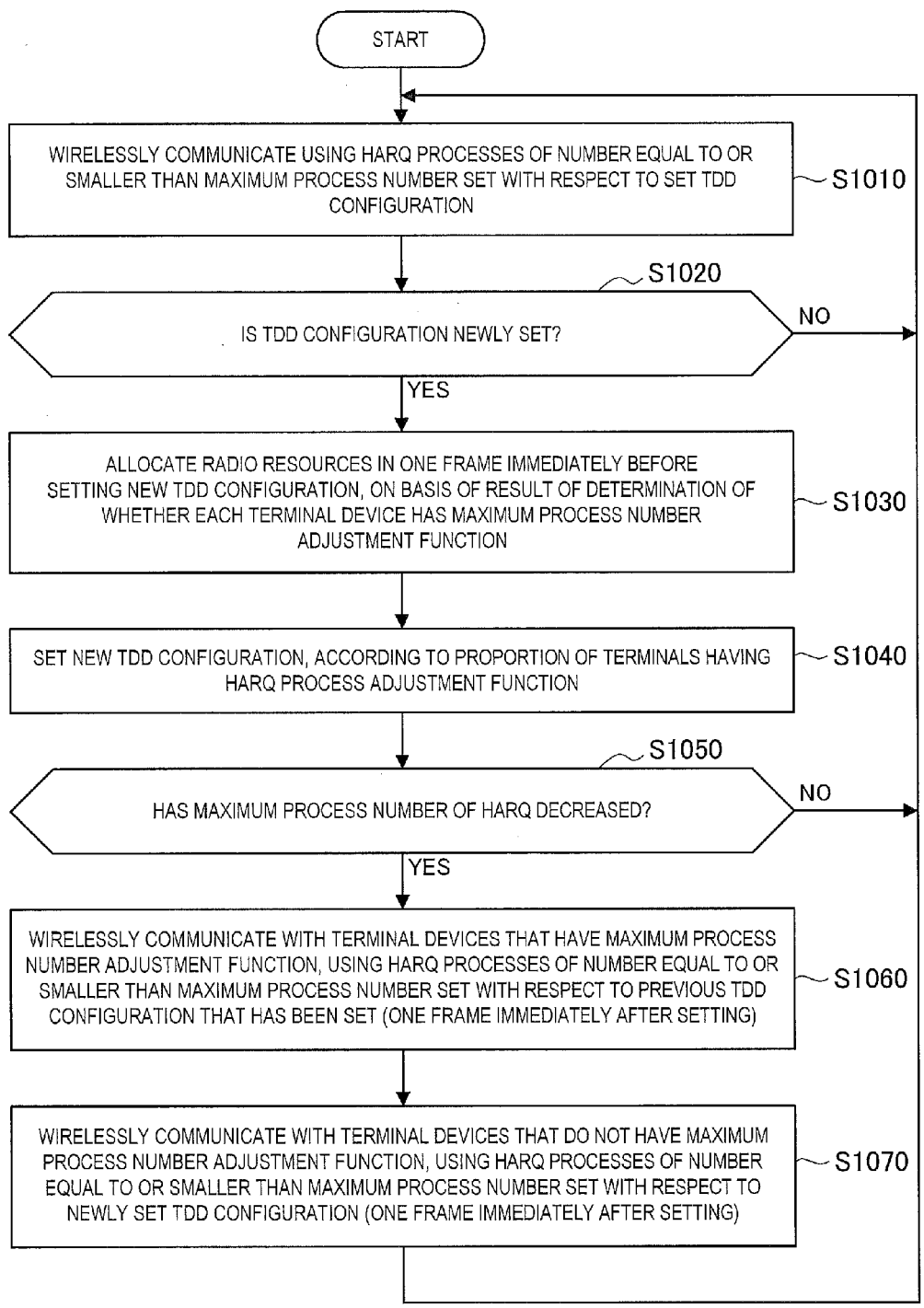
FIG. 22 is a flowchart illustrating an example of a schematic flow of a second communication control process of a base station according to a second embodiment.

FIG. 22 is a flowchart illustrating an example of the schematic flow of the second communication control process of the base station according to the second embodiment.

In step S1010, the process control unit 167 communicates wirelessly with each of a plurality of terminal devices via the radio communication unit 120, using the HARQ processes of a number equal to or smaller than the maximum process number set with respect to the set TDD configuration.

In step S1020, the configuration setting unit 163 determines whether to set a new TDD configuration. If a TDD configuration is newly set, the process proceeds to step S1030. Otherwise, the process returns to step S1010.

In step S1030, the resource allocating unit 169 allocates, to the above plurality of terminal devices, the radio resources in one frame immediately before setting a new TDD configuration, on the basis of a result of determination of whether each of a plurality of terminal devices has the maximum process number adjustment function.

In step S1040, the configuration setting unit 151 sets a new TDD configuration, according to the proportion of the terminal devices that have the maximum process number adjustment function 200 among the above plurality of terminal devices.

In step S1050, the process control unit 167 determines whether the maximum process number of HARQ set with respect to the previous TDD configuration that has been set is larger than the maximum process number of HARQ set with respect to the newly set TDD configuration. That is, the process control unit 167 determines whether the maximum process number of HARQ set with respect to the TDD configuration has decreased, on the basis of the new setting of the TDD configuration. If the maximum process of HARQ has decreased, the process proceeds to step S1060. Otherwise, the process returns to step S1010.

In step S1060, the process control unit 167 communicates wirelessly with the terminal devices 200 via the radio communication unit 120, using HARQ processes of a number equal to or smaller than the maximum process number set with respect to the previous TDD configuration that has been set, during one frame after setting a new TDD configuration.

Also, in step S1070, the process control unit 167 communicates wirelessly with the legacy terminal device via the radio communication unit 120, using the HARQ process of the number equal to or smaller than the maximum process number set with respect to the newly set TDD configuration, during one frame after setting a new TDD configuration. Then, the process returns to step S1010.

In the above, the second embodiment of the present disclosure has been described. As described above, according to the second embodiment, even when the legacy terminal devices that do not have the maximum process number adjustment function and the terminal devices 200 that have the function are mixed in the cell 10, the radio resources are utilized more effectively.

5. THIRD EMBODIMENT

Next, the third embodiment of the present disclosure will be described. According to the third embodiment of the present disclosure, radio communication in two or more frequency bands is controlled. Then, in each of the two or more frequency bands, TDD configurations are newly set at different times. Thereby, utilization loss of radio resources occurring in a concentrated manner is prevented.

<5.1. Configuration of Base Station>

Figure 23:
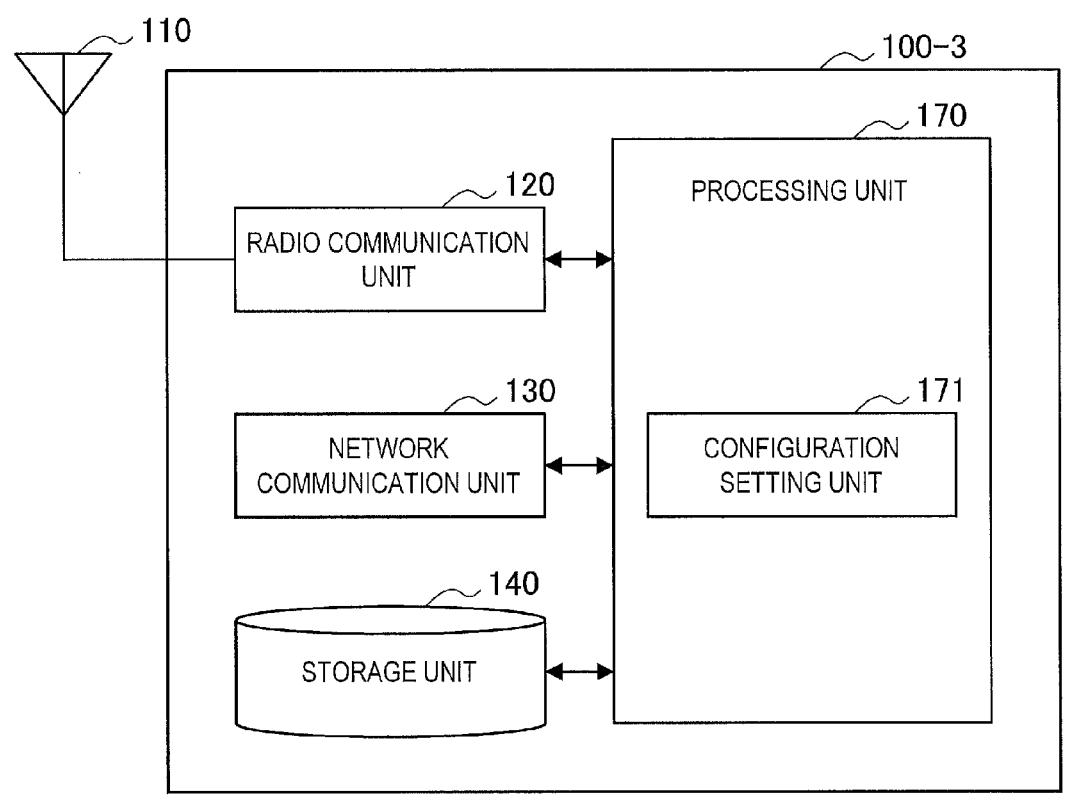
FIG. 23 is a block diagram illustrating an example of a configuration of a base station according to a third embodiment.
Figure 24:
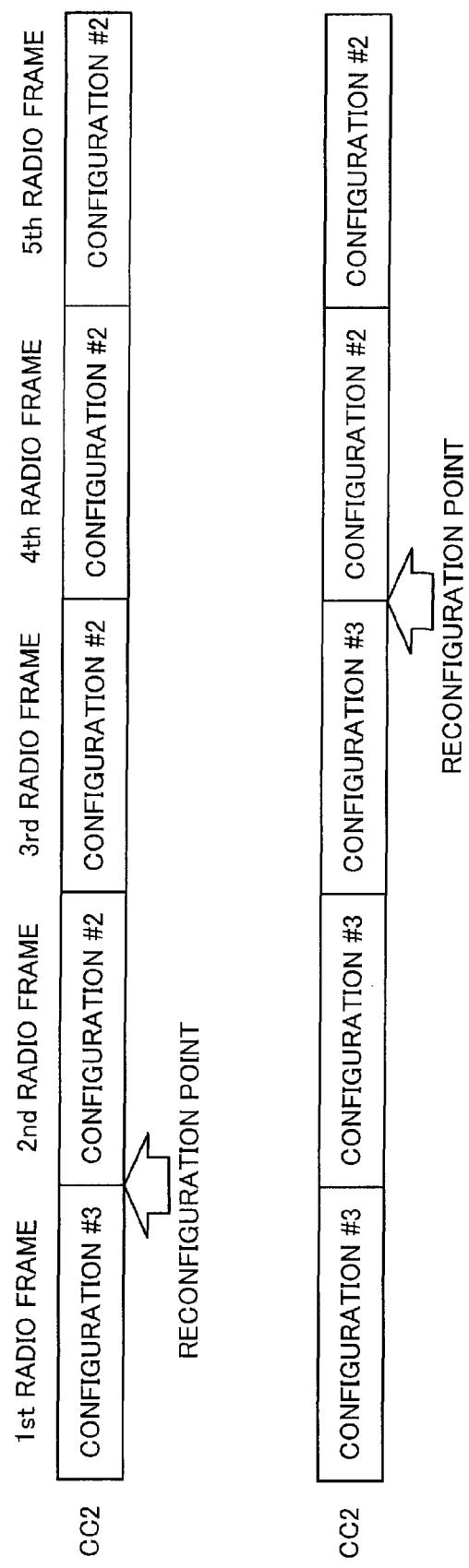
FIG. 24 is an explanatory diagram for describing an example of timing of TDD configuration setting in each CC.

With reference to FIGS. 23 and 24, an example of the configuration of the base station 100-3 according to the third embodiment will be described. FIG. 23 is a block diagram illustrating an example of the configuration of the base station 100-3 according to the third embodiment. Referring to FIG. 23, the base station 100-3 includes an antenna 110, a radio communication unit 120, a network communication unit 130, a storage unit 140, and a processing unit 170.

Here, there is no difference between the first embodiment and the third embodiment, with respect to the antenna 110, the radio communication unit 120, the network communication unit 130, and the storage unit 140. Thus, here, the processing unit 170 will be described.

(Processing Unit 170)

The processing unit 170 provides various functions of the base station 100-3. The processing unit 160 includes a configuration setting unit 171.

(Configuration Setting Unit 171)

In the third embodiment, the base station 100 controls the radio communication in the two or more frequency bands in accordance with the TDD method. Each of the two or more frequency bands is, for example, a component carrier (CC). Then, the configuration setting unit 171 sets a TDD configuration indicating a link direction of each subframe, with respect to each frame, for each CC.

In particular, in the third embodiment, the configuration setting unit 171 sets a TDD configuration at a first time in one CC among the above two or more CC, and sets a TDD configuration at a second time different from the first time in another CC among the above two or more CC. In other words, for example, the configuration setting unit 171 sets a TDD configuration at different times for each CC. In the following, a specific example of this point will be described with reference to FIG. 24.

FIG. 24 is an explanatory diagram for describing an example of timing of TDD configuration setting in each CC. Referring to FIG. 24, TDD configurations in each radio frame in each of CC1 and CC2, and timing of setting a new TDD configuration (i.e., Reconfiguration Point) are illustrated. For example, in CC1, the TDD configuration #3 is set in the first radio frame, and the TDD configuration #2 is set in the second radio frame. Also, in CC2, the TDD configuration #3 is set in the period from the first radio frame to the third radio frame and the TDD configuration #2 is set in the fourth radio frame. As one example, as in this example, timing of TDD configuration setting is shifted between CCs by two frames. As above, the TDD configuration is set at different times for each CC.

With this setting, the radio frame including a subframe in which data is unable to be transmitted is different in each CC, due to deletion of the HARQ process. Hence, utilization loss of radio resources occurring in a concentrated manner is prevented.

Note that, in the third embodiment as well, the maximum number of the process number may be adjusted during a predetermined period after setting a new TDD configuration, when the new TDD configuration is set, in the same way as the first embodiment and the second embodiment. That is, the processing unit 170 may also include each component of the processing unit 150 of the first embodiment, or each component of the processing unit 160 of the second embodiment.

In this case, the above setting of TDD configurations at times of each CC prevents the process for circumventing utilization loss of radio resources from concentrating. As a result, the instantaneous load is reduced.

<5.2. Flow of Process>

Figure 25:
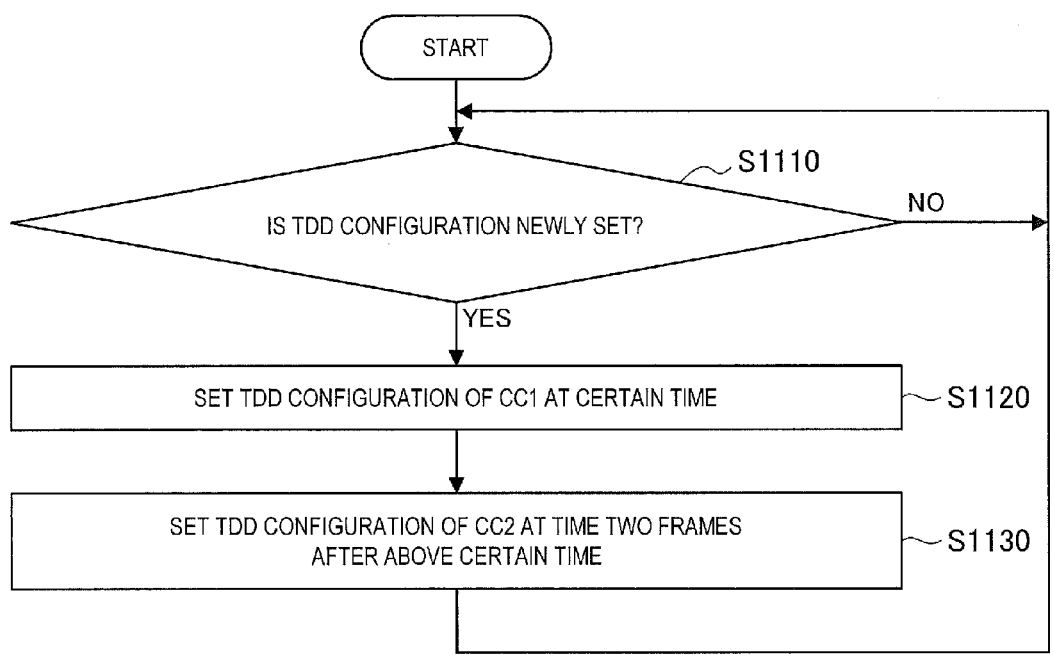
FIG. 25 is a flowchart illustrating an example of a schematic flow of a communication control process of a base station according to a third embodiment.

Next, with reference to FIG. 25, an example of the communication control process according to the third embodiment will be described. FIG. 25 is a flowchart illustrating an example of the schematic flow of the communication control process of the base station according to the third embodiment.

In step S1110, the configuration setting unit 171 determines whether to set a new TDD configuration. If a TDD configuration is newly set, the process proceeds to step S1120. Otherwise, the process repeats step S1110.

In step S1120, the configuration setting unit 171 sets a TDD configuration of CC1 at a certain time.

In step S1130, the configuration setting unit 171 sets the TDD configuration of CC2 at a time two frames after the above certain time. Then, the process returns to step S1110.

In the above, the third embodiment of the present disclosure has been described. As described above, according to the third embodiment, utilization loss of radio resources is prevented from occurring in a concentrated manner, or the process for circumventing utilization loss of radio resources is prevented from concentrating.

6. APPLICATION

The technology related to the present disclosure can be applied to various products. For example, the base station 100 may be realized as one kind of evolved NodeB (eNB) such as a macro eNB or a small eNB. The small eNB may be an eNB that covers a smaller cell, such as a pico eNB, a micro eNB, or a home (pemto) eNB, than a macro cell. Instead, the base station 100 may be realized as another kind of base station such as a NodeB or a base transceiver station (BTS). The base station 100 may include a main body (also referred to as a base station device) controlling radio communication and at least one remote radio head (RRH) disposed at a different location than the main body. The various kinds of terminals described below may perform a base station function temporarily or semi-permanently to operate as the base station 100.

The terminal device 200 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the terminal device 200 may also be realized as a terminal that conducts machine-to-machine (M2M) communication (also called a machine-type communication (MTC) terminal). Furthermore, the terminal device 200 may be a radio communication module mounted onboard these terminals (for example, an integrated circuit module configured on a single die).

<<6.1. Application Example of Base Station>>

(First Application)

Figure 26:
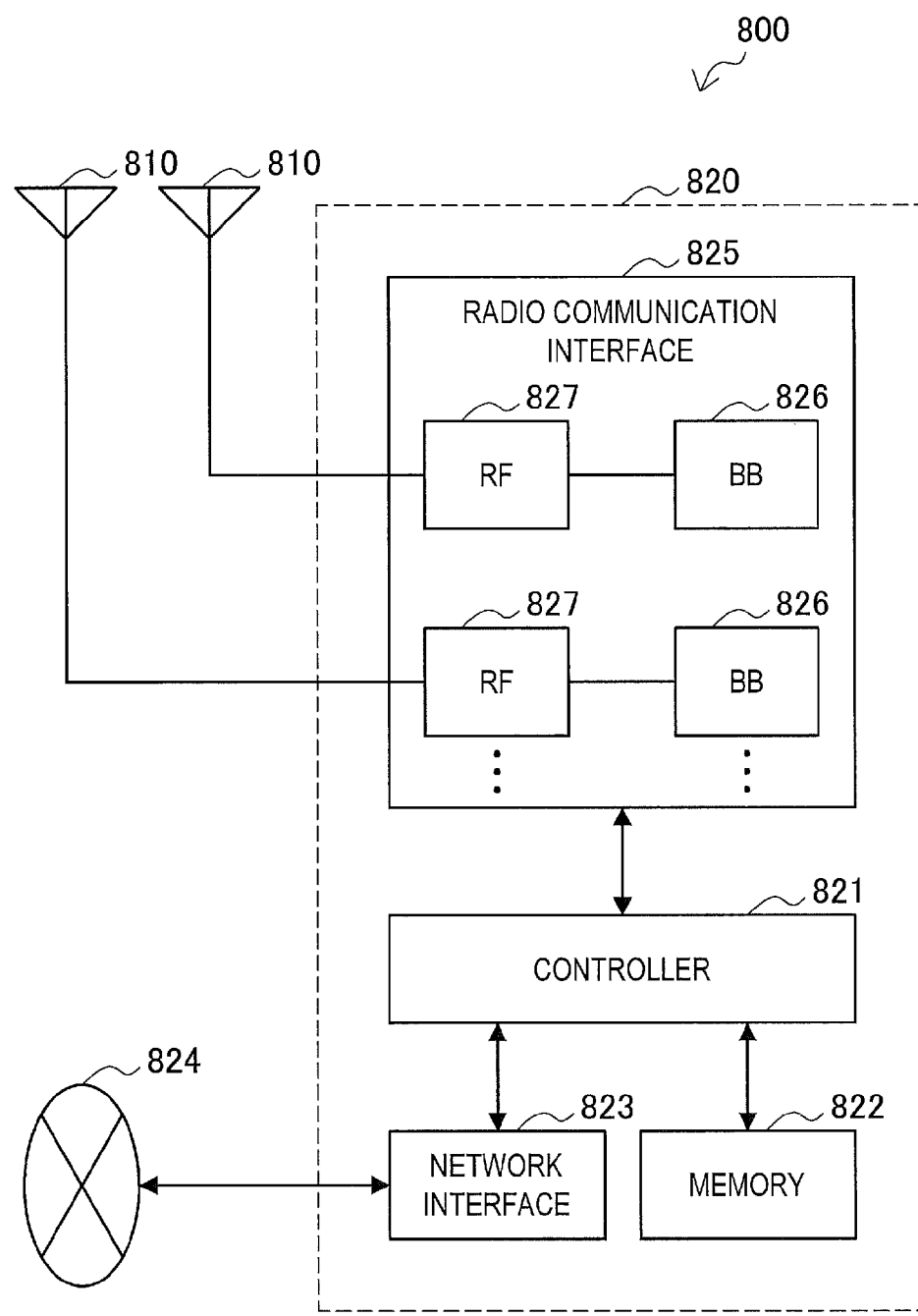
FIG. 26 is a block diagram illustrating a first example of a schematic configuration of an eNB to which the technology of the present disclosure may be applied.

FIG. 26 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as illustrated in FIG. 26, and the plurality of antennas 810 may respectively correspond to a plurality of frequency bands used by the eNB 800, for example. Note that although FIG. 26 illustrates an example of the eNB 800 including a plurality of antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNB via the network interface 823. In this case, the eNB 800 and the core network node or other eNB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as illustrated in FIG. 26, and the plurality of BB processors 826 may respectively correspond to a plurality of frequency bands used by the eNB 800, for example. In addition, the radio communication interface 825 may also include a plurality of RF circuits 827 as illustrated in FIG. 26, and the plurality of RF circuits 827 may respectively correspond to a plurality of antenna elements, for example. Note that although FIG. 26 illustrates an example of the radio communication interface 825 including a plurality of BB processors 826 and a plurality of RF circuits 827, the radio communication interface 825 may also include a single BB processor 826 or a single RF circuit 827.

(Second Application)

Figure 27:
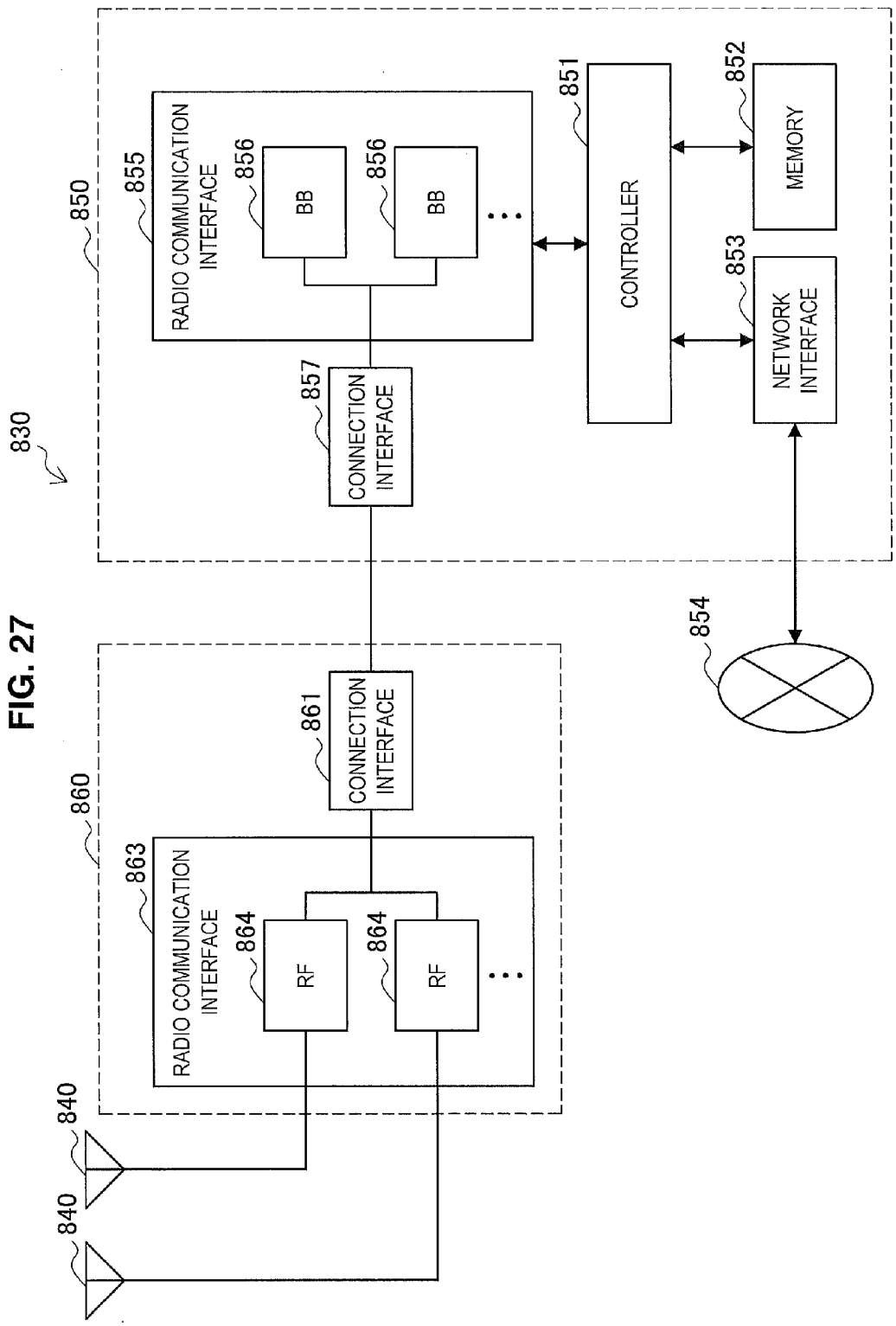
FIG. 27 is a block diagram illustrating a second example of a schematic configuration of an eNB to which the technology of the present disclosure may be applied.

FIG. 27 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as illustrated in FIG. 27, and the plurality of antennas 840 may respectively correspond to a plurality of frequency bands used by the eNB 830, for example. Note that although FIG. 27 illustrates an example of the eNB 830 including a plurality of antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 26.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 26, except for being connected to an RF circuit 864 of the RRH 860 via the connection interface 857. The radio communication interface 855 may also include a plurality of BB processors 856 as illustrated in FIG. 27, and the plurality of BB processors 856 may respectively correspond to a plurality of frequency bands used by the eNB 830, for example. Note that although FIG. 27 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as illustrated in FIG. 27, and the plurality of RF circuits 864 may respectively correspond to a plurality of antenna elements, for example. Note that although FIG. 27 illustrates an example of the radio communication interface 863 including a plurality of RF circuits 864, the radio communication interface 863 may also include a single RF circuit 864.

In the eNB 800 and the eNB 830 illustrated in FIGS. 26 and 27, the configuration setting unit 151, the process control unit 153, and the resource allocating unit 155 described with reference to FIG. 14, the function determination unit 161, the configuration setting unit 163, the time-interval selecting unit 165, the process control unit 167, and the resource allocating unit 169 described with reference to FIG. 20, and the configuration setting unit 171 described with reference to FIG. 23 may be implemented in the radio communication interface 825, the radio communication interface 855, and/or the radio communication interface 863. Also, at least a part of these functions may be implemented in the controller 821 and the controller 851.

<<6.2. Application Example of Terminal Device>>

(First Application)

Figure 28:
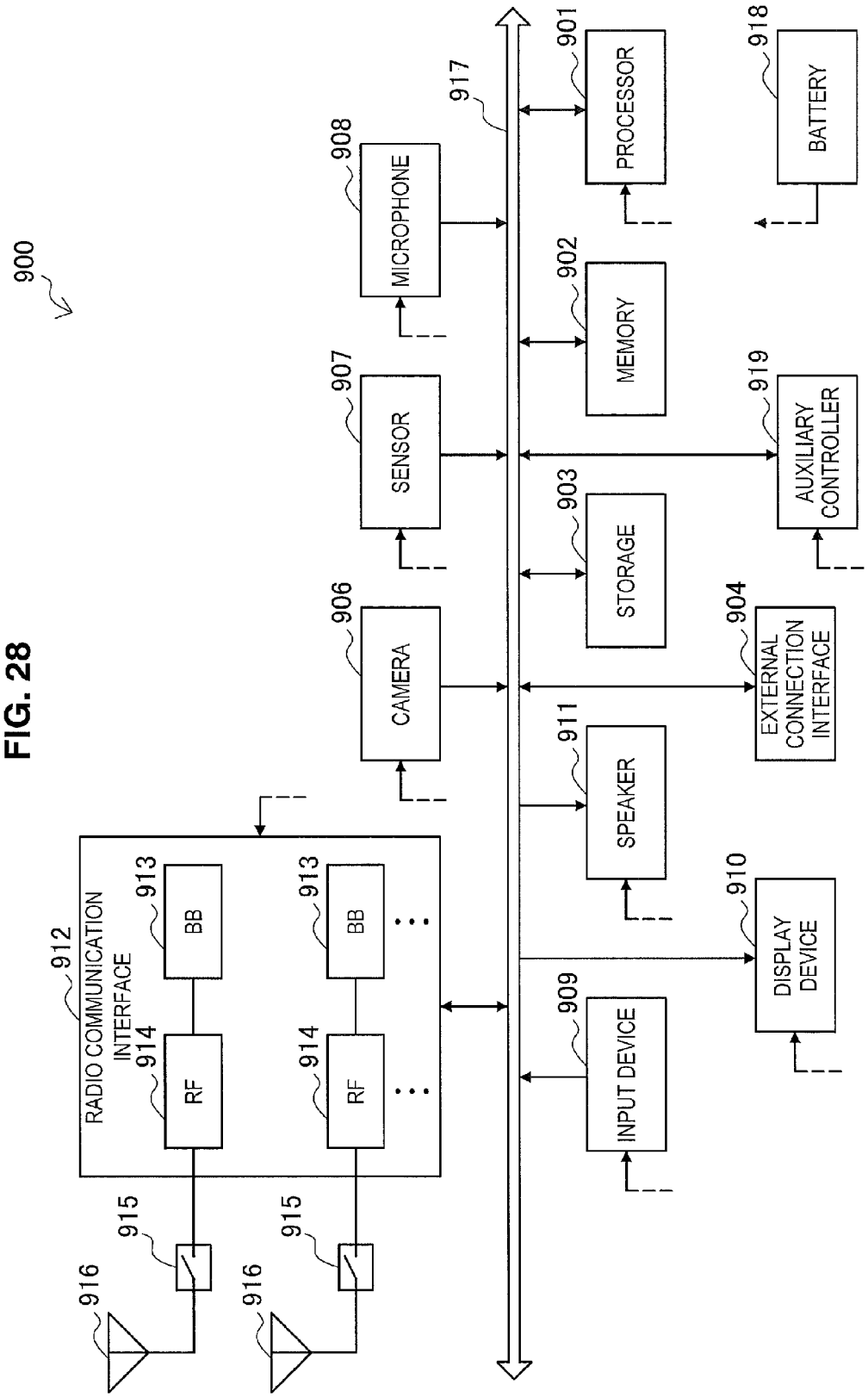
FIG. 28 is a block diagram illustrating an example of a schematic configuration of a smartphone to which technology according of the present disclosure may be applied.

FIG. 28 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 28. Note that although FIG. 28 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as illustrated in FIG. 28. Note that although FIG. 28 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 28 via power supply lines partially illustrated with dashed lines in the drawing. The auxiliary controller 919 causes minimal functions of the smartphone 900 to operate while in a sleep mode, for example.

In the smartphone 900 illustrated in FIG. 28, the communication control unit 241 described with reference to FIG. 17 may be implemented in the radio communication interface 912. Also, at least some of these functions may also be implemented in the processor 901 or the auxiliary controller 919.

(Second Application)

FIG. 29 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as illustrated in FIG. 29. Note that although FIG. 29 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as illustrated in FIG. 29. Note that although FIG. 29 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 29 via power supply lines partially illustrated with dashed lines in the drawing. Also, the battery 938 stores electric power supplied from the vehicle.

In the car navigation device 920 illustrated in FIG. 29, the communication control unit 241 described with reference to FIG. 17 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

7. CONCLUSION

In the above, using FIGS. 1 to 25, the base station, the terminal device, and each communication control process according to the embodiments of the present disclosure have been described. According to the embodiments of the present disclosure, a TDD configuration indicating a link direction of each subframe is set with respect to each frame including a plurality of subframes. Also, the above HARQ process is controlled in such a manner that the number of HARQ processes with respect to the terminal devices 200 is equal to or smaller than the maximum number according to the setting of the TDD configuration. Then, when the second TDD configuration is set after the first TDD configuration, and the first maximum process number of HARQ set with respect to the above first TDD configuration is larger than the second maximum process number of HARQ set with respect to the above second TDD configuration, the above maximum number is larger than the above second maximum process number.

Thereby, even if the TDD configuration is set dynamically, the number of HARQ processes that are deleted when setting the new configuration can decrease. As a result, more HARQ processes are used immediately before setting the new TDD configuration, to transmit data. As a result, utilization loss of radio resources can decrease. That is, the radio resources are utilized more effectively. Thus, the throughput of the communication system 1 can improve.

Also, even if the TDD configuration is switched frequently, utilization loss of radio resources does not occur. Thereby, the throughput is improved more by switching the TDD configuration.

Further, for example, the above maximum number according to the setting of the TDD configuration is equal to or larger than above first maximum process number, during the above predetermined period.

Thereby, even if the TDD configuration is set dynamically, any HARQ process is not deleted when setting the new configuration. As a result, more HARQ processes are used immediately before setting the new TDD configuration, to transmit data. As a result, utilization loss of radio resources is eliminated. That is, the radio resources are utilized more effectively. Thus, the throughput of the communication system 1 can improve.

Further, for example, the above maximum number according to the setting of the TDD configuration is the above first maximum process number during the above predetermined period.

Thereby, even if the TDD configuration is set dynamically, the number of HARQ processes is maintained when setting the new configuration. As a result, more HARQ processes are used immediately before setting the new TDD configuration, to transmit data. As a result, utilization loss of radio resources is eliminated. That is, the radio resources are utilized more effectively. Thus, the throughput of the communication system 1 can improve. Further, the number of HARQ processes is reduced to the necessary and sufficient number, and therefore the process amount and the memory region are saved.

Also, for example, the above predetermined period is a period that is equal to or shorter than one frame after setting the above second TDD configuration. More specifically, for example, the above predetermined period is a period from the setting of the above second TDD configuration to the end of transmission and reception of an ACK or a NACK in response to the data transmitted and received while setting the first TDD configuration.

Thereby, the period in which the number of TDD configurations is large is limited to the necessary and sufficient period. Thereby, the process amount and the memory region are saved when setting the new configuration.

Also, as described in the second embodiment, for example, whether each of a plurality of terminal devices that communicate wirelessly has the maximum process number adjustment function is determined. The HARQ processes with respect to each of one or more terminal devices is controlled in such a manner that the number of the above HARQ processes with respect to each of the above one or more terminal devices 200 having the maximum process number adjustment function among a plurality of terminal devices is equal to or smaller than the maximum number according to the setting of the TDD configuration.

Thereby, even when the legacy terminal devices that do not have the maximum process number adjustment function and the terminal devices 200 that have the function are mixed in the cell 10, the radio resources are utilized more effectively.

Also, as described in the second embodiment, for example, the radio resources during the period before a predetermined period after setting a new TDD configuration are allocated to a plurality of terminal devices, on the basis of a result of determination of whether each of the above plurality of terminal devices has the maximum process number adjustment function. More specifically, for example, the radio resources during the above period before the above predetermined period is more preferentially allocated to the above one or more terminal devices 200 having the maximum process number adjustment function among a plurality of terminal devices, rather than one or more legacy terminal devices.

In such allocation, radio resources are allocated preferentially to the terminal devices 200 that can transmit data using more HARQ processes, rather than the legacy terminal devices, during the period immediately before setting a new TDD configuration. As a result, utilization loss of radio resources can be smaller. That is, the radio resources are utilized more effectively. Thus, the throughput can improve in the communication system 1.

Also, as described in the second embodiment, for example, the time interval of setting the TDD configuration is selected, on the basis of a result of determination of whether each of a plurality of terminal devices has the maximum process number adjustment function. More specifically, for example, the above time interval is selected, according to the proportion of one or more terminal devices 200 having the maximum process number adjustment function among the above plurality of terminal devices. Further specifically, for example, when the above proportion is a first proportion, the first time interval is selected, and when the above proportion is a second proportion that is smaller than the above first proportion, the above first time interval or a second time interval that is longer than the first time interval is selected.

As described above, when the terminal devices that have the maximum process number adjustment function 200 are many, the TDD configuration is switched optimally with high frequency, to improve the throughput.

Also, when the terminal devices that have the maximum process number adjustment function 200 is few, the TDD configuration is switched with low frequency, to prevent HARQ processes from being deleted in legacy terminal devices. As a result, utilization loss of radio resources can be smaller. That is, the radio resources are utilized more effectively. Thus, the throughput can improve in the communication system 1.

Also, as described in the second embodiment, for example, the TDD configuration is set, on the basis of a result of determination of whether each of a plurality of terminal devices has the maximum process number adjustment function. For example, the TDD configuration is set, according to the proportion of one or more terminal devices 200 having the maximum process number adjustment function among the above plurality of terminal devices. More specifically, for example, the above proportion is lower than a predetermined proportion. In this case, a new TDD configuration is set in such a manner that the difference between the maximum process number set with respect to the existing TDD configuration and the maximum process number set with respect to a newly set TDD configuration set is equal to or smaller than a predetermined number.

As described above, when the terminal devices that have the maximum process number adjustment function 200 are many, the TDD configuration is switched optimally with high frequency, to improve the throughput.

Also, when the terminal devices that have the maximum process number adjustment function 200 is few, the TDD configuration is switched with low frequency, to prevent HARQ processes from being deleted in legacy terminal devices. As a result, utilization loss of radio resources can be smaller. That is, the radio resources are utilized more effectively. Thus, the throughput can improve in the communication system 1.

Also, as described in the third embodiment, a TDD configuration is set at a first time in one CC among two or more CC, and a TDD configuration is set at a second time that is different from the first time in another CC among the above two or more CC.

With this setting, the radio frame including a subframe in which data is unable to be transmitted is different in each CC, due to deletion of the HARQ process. Hence, utilization loss of radio resources occurring in a concentrated manner is prevented.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Also, the processing steps in a communication control process in this specification are not strictly limited to being executed in a time series following the sequence described in a flowchart. For example, the processing steps in a communication control process may be executed in a sequence that differs from a sequence described herein as a flowchart, and furthermore may be executed in parallel.

In addition, it is possible to create a computer program for causing hardware such as a CPU, ROM, and RAM built into a communication control device (for example, device of a base station) and a terminal device to exhibit functions similar to each structural element of the foregoing communication control device and the terminal device. It becomes also possible to provide a storage medium which stores the computer program.

Additionally, the present technology may also be configured as below.

(1)

A communication control device configured to control radio communication in accordance with a time division duplex (TDD) method, the communication control device including:

a setting unit configured to set a link direction configuration indicating a link direction of each subframe, with respect to each frame including a plurality of subframes; and a control unit configured to control processes of automatic repeat request with respect to a terminal device that performs radio communication, wherein the control unit controls the processes to make a number of the processes equal to or smaller than a maximum number according to setting of the link direction configuration, and wherein, when a second link direction configuration is set by the setting unit after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

(2)

The communication control device according to (1), wherein the predetermined period is a period that is equal to or shorter than one frame after setting the second link direction configuration.

(3)

The communication control device according to (1) or (2), wherein the maximum number is equal to or larger than the first maximum process number during the predetermined period.

(4)

The communication control device according to (3), wherein the maximum number is the first maximum process number during the predetermined period.

(5)

The communication control device according to any one of (1) to (4), further including:

a determination unit configured to determine whether each of a plurality of terminal devices that performs radio communication has a function of making the maximum number of the processes of automatic repeat request during the predetermined period larger than the second maximum process number, wherein the control unit controls the processes of automatic repeat request with respect to each of the plurality of terminal devices, and wherein the control unit controls the processes with respect to each of one or more terminal devices, in such a manner that the number of the processes is equal to or smaller than the maximum number with respect to each of the one or more terminal devices having the function among the plurality of terminal devices, on the basis of a determination result of whether each of the plurality of terminal devices has the function.

(6)

The communication control device according to (5), wherein the determination unit determines whether each of the plurality of terminal devices has the function, on the basis of a result of an inquiry by individual signaling to each of the plurality of terminal devices.

(7)

The communication control device according to (5) or (6), further including:

an allocation unit configured to allocate, to the plurality of terminal devices, radio resources in a period before the predetermined period, on the basis of the determination result of whether each of the plurality of terminal devices has the function.

(8)

The communication control device according to (7), wherein the period before the predetermined period is one frame immediately before the predetermined period.

(9)

The communication control device according to (7) or (8), wherein the allocation unit allocates the radio resources more preferentially to the one or more terminal devices having the function, than to one or more other terminal devices that do not have the function, among the plurality of terminal devices.

(10)

The communication control device according to any one of (7) to (9), wherein the allocation unit allocates radio resources of an amount equal to or smaller than an amount corresponding to the second maximum process number, among the radio resources, to one or more other terminal devices that do not have the function, among the plurality of terminal devices.

(11)

The communication control device according to any one of (5) to (10), further including:

a selection unit configured to select a time interval of setting of the link direction configuration, on the basis of the determination result of whether each of the plurality of terminal devices has the function, wherein the setting unit sets the link direction configuration at the selected time interval.

(12)

The communication control device according to (11), wherein the selection unit selects the time interval, according to a proportion of the one or more devices having the function among the plurality of terminal devices.

(13)

The communication control device according to (12), wherein the selection unit selects a first time interval when the proportion is a first proportion, and selects the first time interval or a second time interval that is longer than the first time interval when the proportion is a second proportion that is lower than the first proportion.

(14)

The communication control device according to any one of (5) to (13), wherein the setting unit sets the link direction configuration on the basis of the determination result of whether each of the plurality of terminal devices has the function.

(15)

The communication control device according to (14), wherein the setting unit sets the link direction configuration, according to a proportion of the one or more devices having the function among the plurality of terminal devices.

(16)

The communication control device according to (15), wherein when the proportion is lower than a predetermined proportion, the setting unit sets a new link direction configuration in such a manner that a difference between a maximum process number set with respect to an existing link direction configuration and a maximum process number set with respect to the newly set link direction configuration is equal to or smaller than a predetermined number.

(17)

The communication control device according to any one of (1) to (16), wherein the communication control device controls the radio communication in two or more frequency bands in accordance with the time division duplex (TDD) method, and the setting unit sets the link direction configuration indicating the link direction, with respect to each frame, for each frequency band, and the setting unit sets the link direction configuration at a first time in one frequency band of the two or more frequency bands, and sets the link direction configuration at a second time that is different from the first time, in another frequency band of the two or more frequency bands.

(18)

A communication control method in a communication control device that controls radio communication in accordance with a time division duplex (TDD) method, the communication control method including:

setting a link direction configuration indicating a link direction of each subframe, with respect to each frame including a plurality of subframes; and controlling processes of automatic repeat request with respect to a terminal device that performs radio communication, wherein the controlling of the processes includes controlling the processes in such a manner that a number of the processes is equal to or smaller than a maximum number according to setting of the link direction configuration, and wherein, when a second link direction configuration is set after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

(19)

A terminal device that performs radio communication in accordance with a time division duplex (TDD) method, the terminal device including:

a communication control unit configured to control, when a link direction configuration indicating a link direction of each subframe is set with respect to each frame including a plurality of subframes, radio communication in accordance with the set link direction configuration, wherein the communication control unit controls processes of automatic repeat request with respect to the terminal device, wherein the communication control unit controls the processes in such a manner that a number of the processes is equal to or smaller than a maximum number according to setting of the link direction configuration, and wherein, when a second link direction configuration is set after a first link direction configuration, and a first maximum process number of automatic repeat request set with respect to the first link direction configuration is larger than a second maximum process number of automatic repeat request set with respect to the second link direction configuration, the maximum number is larger than the second maximum process number during a predetermined period after setting the second link direction configuration.

(20)

A communication control device that controls radio communication in two or more frequency bands in accordance with a time division duplex (TDD) method, the communication control device including:

a setting unit configured to set a link direction configuration indicating a link direction of each subframe, with respect to each frame including two or more subframes, for each frequency band, wherein the setting unit sets the link direction configuration at a first time in one frequency band of the two or more frequency bands, and sets the link direction configuration at a second time that is different from the first time, in another frequency band of the two or more frequency bands.

REFERENCE SIGNS LIST 1 communication system
10 cell
100 base station
150, 160, 170 processing unit
151, 163, 171 configuration setting unit
153, 167 process control unit
155, 169 resources allocating unit
161 function determination unit
165 time-interval selecting unit
200 terminal device
240 processing unit
241 communication control unit

The invention claimed is:

1. A communication control device, comprising:
a central processing unit (CPU) configured to:
control radio communication based on time division duplexing;
set a first link direction configuration at a first time, wherein the first link direction configuration indicates a link direction of each of a plurality of first subframes of a first frame;
set a second link direction configuration at a second time, wherein the second link direction configuration indicates the link direction of each of a plurality of second subframes of a second frame,
wherein the second time is subsequent to the first time;
control automatic repeat request processes with respect to a terminal device, wherein the terminal device communicates through radio;
set a first number of the automatic repeat request processes equal to a threshold, based on the first link direction configuration and the second link direction configuration, wherein the first link direction configuration is associated with a second number of the automatic repeat request processes, and
wherein the second link direction configuration is associated with a third number of the automatic repeat request processes; and
set the threshold larger than the second number of the automatic repeat request processes, based on the second number of the automatic repeat request processes that is larger than the third number of the automatic repeat request processes,
wherein the threshold is set during a first time period that initiates from the second time.

2. The communication control device according to claim 1, wherein the first time period is equal to or shorter than one frame that is subsequent to the second time.

3. The communication control device according to claim 1, wherein the CPU is further configured to:
determine each of a plurality of terminal devices has a function to set the threshold, during the first time period, larger than the third number of the automatic repeat request processes, wherein the plurality of terminal devices communicates through radio,
control the automatic repeat request processes with respect to each of the plurality of terminal devices, and
set the first number of the automatic repeat request processes equal to the threshold with respect to at least one first terminal device of the plurality of terminal devices, wherein the at least one first terminal device has the function,
wherein the first number of the automatic repeat request processes is set based on the determination.

4. The communication control device according to claim 3, wherein the determination is based on an inquiry signal transmitted to each of the plurality of terminal devices.

5. The communication control device according to claim 3, the CPU is further configured to allocate, to the plurality of terminal devices, radio resources in a second time period that precedes the first time period, wherein the allocation is based on the determination.

6. The communication control device according to claim 5, wherein the second time period is one frame before the first time period.

7. The communication control device according to claim 5, wherein the CPU is further configured to prefer the allocation of the radio resources to the at least one first terminal device of the plurality of terminal devices than the allocation of the radio resources to at least one second terminal device, of the plurality of terminal devices, wherein the at least one second terminal device lacks the function.

8. The communication control device according to claim 5, wherein the CPU is further configured to allocate the radio resources, of a first amount equal to or smaller than a second amount that corresponds to the third number of the automatic repeat request processes, to at least one second terminal device of the plurality of terminal devices,
wherein the at least one second terminal device lacks the function.

9. The communication control device according to claim 3, the CPU is further configured to:
select a first time interval based on the determination,
set at least one of the first link direction configuration or the second link direction configuration, based on the selected first time interval.

10. The communication control device according to claim 9, wherein the selection is based on a proportion of the at least one first terminal device of the plurality of terminal devices.

11. The communication control device according to claim 10,
wherein the CPU is further configured to select one of a second time interval or a third time interval, based on the proportion that corresponds to one of a first value or a second value, respectively,
wherein the third time interval is longer than the second time interval, and
wherein the second value is lower than the first value.

12. The communication control device according to claim 3, wherein
the CPU is further configured to set at least one of the first link direction configuration or the second link direction configuration, based on the determination.

13. The communication control device according to claim 12, wherein the CPU is further configured to set at least one of the first link direction configuration or the second link direction configuration, based on a proportion of the at least one first terminal device of the plurality of terminal devices.

14. The communication control device according to claim 13, wherein the CPU is further configured to set the second link direction configuration such that a difference between the second number of the automatic repeat request processes and the third number of the automatic repeat request processes is equal to or smaller than a number.

15. The communication control device according to claim 1, wherein the CPU is further configured to:
control the radio communication in at least two frequency bands based on the time division duplexing,
set at least one of the first link direction configuration or the second link direction configuration for each frequency band of the at least two frequency bands,
set one of the first link direction configuration or the second link direction configuration at a third time in a first frequency band of the at least two frequency bands, and
set one of the first link direction configuration or the second link direction configuration at a fourth time that is different from the third time, in a second frequency band of the at least two frequency bands.

16. A communication control method in a communication control device that controls radio communication based on time division duplexing, comprising:
setting a first link direction configuration at a first time, wherein the first link direction configuration indicating a link direction of each of a plurality of first subframes of a first frame;
setting a second link direction configuration at a second time, wherein the second link direction configuration indicating the link direction of each of a plurality of second subframes of a second frame, and
wherein the second time is subsequent to the first time;
controlling automatic repeat request processes with respect to a terminal device, wherein the terminal device communicates through radio;
setting a first number of the automatic repeat request processes equal to a threshold, based on the first link direction configuration and the second link direction configuration,
wherein the first link direction configuration is associated with a second number of the automatic repeat request processes, and
wherein the second link direction configuration is associated with a third number of the automatic repeat request processes; and
setting the threshold larger than the second number of the automatic repeat request processes, based on the second number of the automatic repeat request processes that is larger than the third number of the automatic repeat request processes,
wherein the threshold is set during a time period that initiates from the second time.

17. A terminal device, comprising:
a central processing unit (CPU) configured to:
communicate through radio based on time division duplexing;
control radio communication based on at least one of a first link direction configuration or a second link direction configuration,
wherein the first link direction configuration is set at a first time,
wherein the first link direction configuration indicates a link direction of each of a plurality of first subframes of a first frame,
wherein the second link direction configuration is set at a second time, and
wherein the second link direction configuration indicates the link direction of each of a plurality of second subframes of a second frame;
control automatic repeat request processes with respect to the terminal device;

set a first number of the automatic repeat request processes equal to a threshold, based on the first link direction configuration and the second link direction configuration,
    wherein the first link direction configuration is associated with a second number of the automatic repeat request processes, and
    wherein the second link direction configuration is associated with a third number of the automatic repeat request processes; and
set the threshold larger than the second number of the automatic repeat request processes, based on the second number of the automatic repeat request processes that is larger than the third number of the automatic repeat request processes,
    wherein the threshold is set during a time period that initiates from the second time.

18. A communication control device, comprising:
a central processing unit (CPU) configured to:
    control radio communication in at least two frequency bands based on time division duplexing;
    set a first link direction configuration at a first time, wherein the first link direction configuration indicates a link direction of each of a plurality of first subframes of a first frame;
    set a second link direction configuration at a second time, wherein the second link direction configuration indicates the link direction of each of a plurality of second subframes of a second frame;
    set a first number of automatic repeat request processes equal to a threshold, based on the first link direction configuration and the second link direction configuration,
        wherein the first link direction configuration is associated with a second number of the automatic repeat request processes, and
        wherein the second link direction configuration is associated with a third number of the automatic repeat request processes;
    set the threshold larger than the second number of the automatic repeat request processes, based on the second number of the automatic repeat request processes that is larger than the third number of the automatic repeat request processes,
        wherein the threshold is set during a time period that initiates from the second time;
    set at least one of the first link direction configuration or the second link direction configuration for each frequency band of the at least two frequency bands;
    set one of the first link direction configuration or the second link direction configuration at a third time in a first frequency band of the at least two frequency bands; and
    set one of the first link direction configuration or the second link direction configuration at a fourth time that is different from the third time, in a second frequency band of the at least two frequency bands.

* * * * *